(12) United States Patent
Dames et al.

(10) Patent No.: US 10,556,476 B2
(45) Date of Patent: Feb. 11, 2020

(54) AGRICULTURAL VEHICLE INCLUDING RIDE HEIGHT ADJUSTABLE SUSPENSION

(71) Applicant: Hagie Manufacturing Company, Clarion, IA (US)

(72) Inventors: Matthew W. Dames, Clarion, IA (US); Michael M. Miller, Clarion, IA (US)

(73) Assignee: Hagie Manufacturing Company, Clarion, IA (US)

( * ) Notice: Subject to any disclaimer, the term of this patent is extended or adjusted under 35 U.S.C. 154(b) by 232 days.

(21) Appl. No.: 15/475,614

(22) Filed: Mar. 31, 2017

(65) Prior Publication Data
US 2017/0203628 A1    Jul. 20, 2017

Related U.S. Application Data

(63) Continuation-in-part of application No. 14/736,877, filed on Jun. 11, 2015, now abandoned, which is a continuation-in-part of application No. 14/248,682, filed on Apr. 9, 2014, now abandoned.

(51) Int. Cl.
  *B60G 17/0165*   (2006.01)
  *A01B 63/00*     (2006.01)
  *A01C 23/04*     (2006.01)

(52) U.S. Cl.
  CPC ........ *B60G 17/0165* (2013.01); *A01B 63/002* (2013.01); *A01C 23/047* (2013.01)

(58) Field of Classification Search
  CPC .......... B60G 17/00; B60G 3/20; B60G 7/001; B60G 2200/18; B60G 2300/08;
  (Continued)

(56) References Cited

U.S. PATENT DOCUMENTS 2,978,255 A * 4/1961 Rosenkrands ........... B60G 3/26
                                                              267/254
3,063,510 A   11/1962 Hunger et al.
                  (Continued)

FOREIGN PATENT DOCUMENTS

GB          2474812 B  *  8/2012  ............... B60G 3/20

OTHER PUBLICATIONS

Author Unknown. 'Custom Built Lifted Rogator'. [online], [retrieved on Jun. 11, 2015]. Retrieved from the Internet <URL: https://www.youtube.com/watch?v=lAGOkMgo514>.
(Continued)

*Primary Examiner* — Jacob D Knutson
(74) *Attorney, Agent, or Firm* — Michael Best & Friedrich LLP

(57) ABSTRACT

An agricultural vehicle includes a frame and a plurality of suspension assemblies coupled to the frame. The plurality of suspension assemblies configured to together increase or decrease a vertical distance between the frame and a surface supporting the agricultural vehicle. The agricultural vehicle also includes a plurality of wheels. One wheel of the plurality of wheels is coupled to each suspension assembly, and at least two wheels of the plurality of wheels are movable about a steering axis. The agricultural vehicle further includes at least two actuators. Each of the at least two actuators is coupled to a respective suspension assembly of the plurality of suspension assemblies and is configured to move one of the at least two wheels.

17 Claims, 38 Drawing Sheets

(58) Field of Classification Search
CPC ............... A01B 63/002; A61C 23/047; B62D 49/0607; B62D 49/0678
USPC ..................................................... 280/830
See application file for complete search history.

(56) References Cited

U.S. PATENT DOCUMENTS

| | | | | |
|---|---|---|---|---|
| 3,711,113 | A * | 1/1973 | Stammreich | B60G 3/26 |
| | | | | 280/124.136 |
| 3,969,034 | A | 7/1976 | Gaul et al. | |
| 4,621,872 | A | 11/1986 | Yotsumoto et al. | |
| 4,848,783 | A | 7/1989 | Christenson | |
| 4,986,386 | A | 1/1991 | Iwamoto et al. | |
| 5,121,808 | A | 6/1992 | Visentini et al. | |
| 5,282,644 | A | 2/1994 | Larson | |
| 5,326,128 | A | 7/1994 | Cromley, Jr. | |
| 5,515,934 | A | 5/1996 | Davis | |
| 6,145,610 | A | 11/2000 | Gallignani | |
| 6,206,125 | B1 | 3/2001 | Weddle | |
| 6,267,387 | B1 * | 7/2001 | Weiss | B60G 3/26 |
| | | | | 280/124.106 |
| 7,163,227 | B1 | 1/2007 | Burns | |
| 7,377,453 | B2 * | 5/2008 | Auer | A01B 73/067 |
| | | | | 239/168 |
| 7,669,675 | B2 | 3/2010 | Hagie | |
| 7,845,443 | B2 | 12/2010 | Liberty et al. | |
| 8,042,817 | B2 * | 10/2011 | Motebennur | B60G 9/00 |
| | | | | 280/5.514 |
| 8,205,892 | B2 | 6/2012 | Mackin et al. | |
| 8,398,179 | B2 | 3/2013 | Mackin et al. | |
| 2004/0163869 | A1 | 8/2004 | Chun et al. | |
| 2006/0244235 | A1 * | 11/2006 | Kusaka | B60G 3/20 |
| | | | | 280/124.136 |
| 2011/0025012 | A1 | 2/2011 | Nakamura | |
| 2011/0148060 | A1 * | 6/2011 | Cuttino | B60G 3/26 |
| | | | | 280/86.751 |
| 2011/0248476 | A1 | 10/2011 | Ericsson | |
| 2016/0075200 | A1 * | 3/2016 | Hansen | B60K 7/0007 |
| | | | | 180/55 |

OTHER PUBLICATIONS

Author Unknown. 'RCM Harvester'. [online], [retrieved on Jun. 11, 2015]. Retrieved from the Internet <URL: http://www.voltake.fi/rcm-harvester>.
Author Unknown. 'Condor MountainMasterPlus'. [online], [retrieved on Jun. 11, 2015]. Retrieved from the Internet <URL: http://www.agrifac.com/condor/condor-mountainmasterplus>.
Author Unknown. 'Condor ClearancePlus'. [online], [retrieved on Jun. 11, 2015]. Retrieved from the Internet <URL:http:// www.agrifac.com/condor/condor-clearanceplus>.
Author Unknown. 'Rogator 600B Number One Choice'. [online], Grubbenvorst, Netherland [retrieved on Jun. 11, 2015]. Retrieved from the Internet <URL: http://www.challenger-eg.com/EMEA/GB/products/applicators/215. htm> (pp. 6, 7, 10, and 11 are the relevant pages).
Dammann, Herbert. 'Dammann-trac DT 2000 H S4 Highlander'. [online], [Hedendorf Germany] [retrieved on Jun. 11, 2015]. Retrieved from the Internet <URL: http://www.dammann-technik.de/html/Produkte/highlander.aspx>.
Leonard, Winston. 'Gryphin—The day after tomorrow . . . '. [online], [Asheville (NC): Mar. 7, 2001], [retrieved on Jun. 11, 2015]. Retrieved from the Internet <URL: http://www.volvoce.com/CONSTRUCTIONEQUIPMENT/ASIA/EN-SG/PRODUCTS/INNOVATIONS/CONCEPT_WHEEL_LOADER/Pages/introduction.aspx>.
Valtanen, Jarkko. 'Takkatec RCM Harver', [online], [retrieved on Jun. 12, 2015]. Retrieved from the Internet <URL: http:// www.rakkatec.fi/rakkatec-3.html>.

* cited by examiner

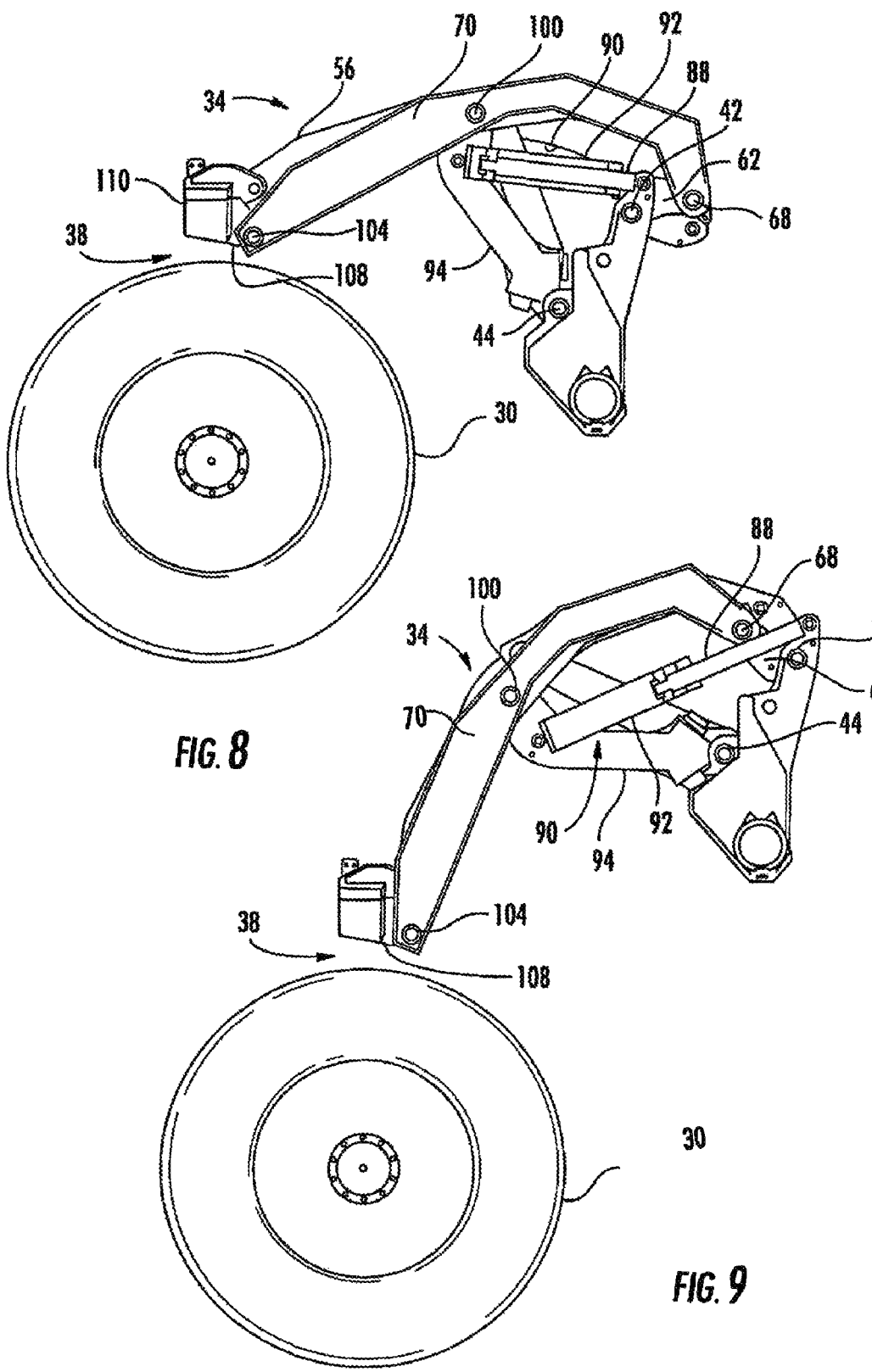

AGRICULTURAL VEHICLE INCLUDING RIDE HEIGHT ADJUSTABLE SUSPENSION

CROSS-REFERENCE TO RELATED APPLICATIONS

This application is a continuation-in-part to U.S. application Ser. No. 14/736,877, filed Jun. 11, 2015, which is a continuation-in-part to U.S. application Ser. No. 14/248,682, filed Apr. 9, 2014, the entire contents of which are incorporated herein by reference.

BACKGROUND

The disclosed embodiments relate to an agricultural vehicle including a ride height adjustable suspension.

SUMMARY

In one embodiment, an agricultural vehicle includes a frame and a plurality of suspension assemblies coupled to the frame. The plurality of suspension assemblies configured to together increase or decrease a vertical distance between the frame and a surface supporting the agricultural vehicle. The agricultural vehicle also includes a plurality of wheels. One wheel of the plurality of wheels is coupled to each suspension assembly, and at least two wheels of the plurality of wheels are movable about a steering axis. The agricultural vehicle further includes at least two actuators. Each of the at least two actuators is coupled to a respective suspension assembly of the plurality of suspension assemblies and is configured to move one of the at least two wheels.

In one embodiment, an agricultural vehicle includes a frame defining a support area configured to support a wet applicator and configured to support a dry applicator above a surface over which the agricultural vehicle is supported. The agricultural vehicle includes a plurality of suspension assemblies coupled to the frame. Each suspension assembly is independently operable and cooperative with each other suspension assembly to move the frame between a first position defined by a first vertical distance between a point on the frame and the surface and a second position defined by a second vertical distance between the point on the frame and the surface.

In one embodiment, a method of selectively coupling an applicator to an agricultural vehicle includes approaching the applicator with the agricultural vehicle. The applicator is configured to be selectively self-supported above a surface that supports the agricultural vehicle. The method also includes lowering a support area of the agricultural vehicle toward the surface, positioning at least a portion of the support area below the applicator, and raising the support area of the agricultural vehicle away from the surface such that the applicator is fully supported by the support area.

In one embodiment, an agricultural vehicle includes a frame defining a support area configured to support a first chemical or fertilizer applicator and configured to support a second chemical or fertilizer applicator above a surface over which the agricultural vehicle is supported. The agricultural vehicle includes a plurality of suspension assemblies coupled to the frame. Each suspension assembly is independently operable and cooperative with each other suspension assembly to move the frame between a first position defined by a first vertical distance between a point on the frame and the surface and a second position defined by a second vertical distance between the point on the frame and the surface. The second vertical distance is greater than the first vertical distance and greater than 50 inches.

Other aspects of the disclosure will become apparent by consideration of the detailed description and accompanying drawings.

BRIEF DESCRIPTION OF THE DRAWINGS

FIG. 8 illustrates a side elevation of a lifting linkage in accordance with one embodiment in the lowered position;

FIG. 9 illustrates a side elevation of a lifting linkage in accordance with one embodiment in the raised position;

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Figure 1:
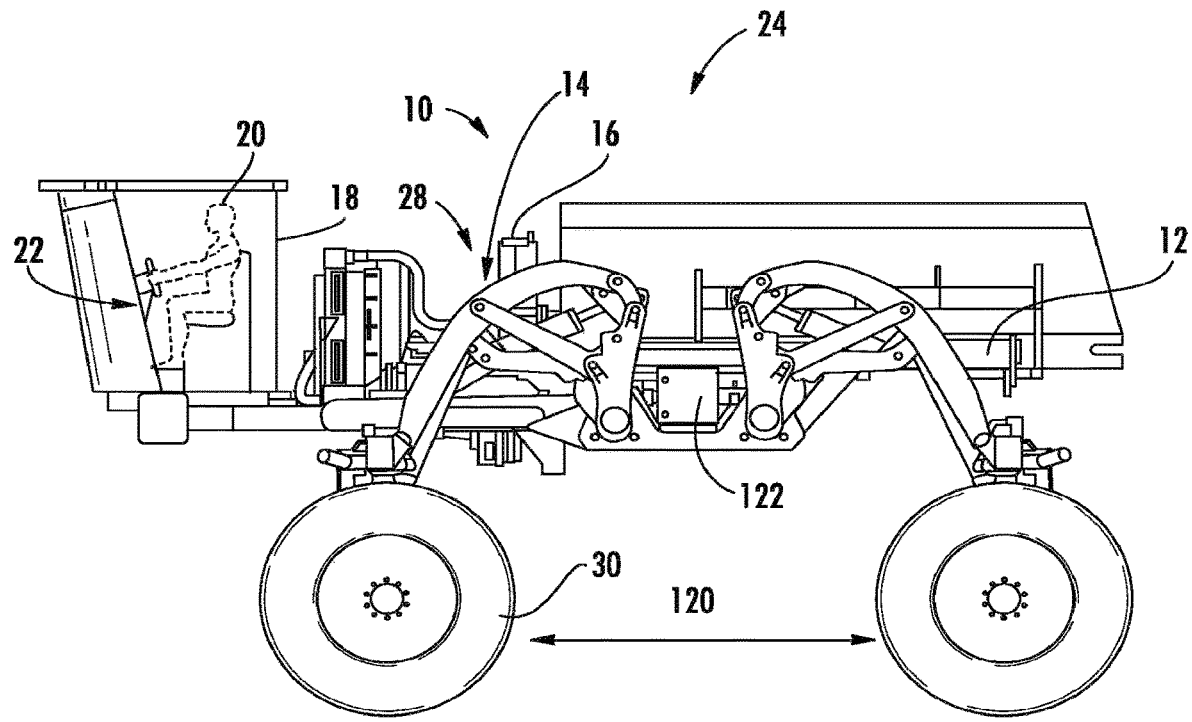
FIG. 1 illustrates a side elevation of an agricultural vehicle in the lifted position in accordance with one embodiment.
Figure 2:
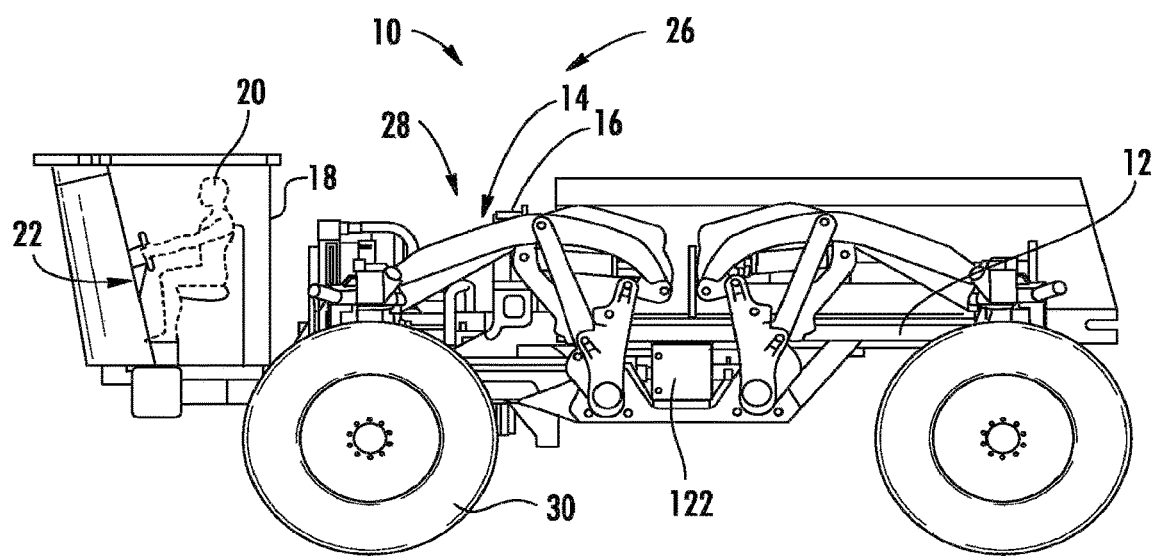
FIG. 2 illustrates the vehicle of FIG. 1 in the lowered position.

As shown in FIG. 1, a variable height vehicle 10 is provided with a frame 12. Coupled to the frame 12 are an engine 14, a hydraulic pump 16, and operator station 18. A user 20 controls the vehicle 10 from a control panel 22 located on the operator station 18. From the operator station 18, the user 20 may lower the vehicle 10 from the lifted orientation 24 shown in FIG. 1 to the lowered orientation 26 shown in FIG. 2.

The vehicle 10 is lifted and lowered by a plurality of closed chain linkages, which are preferably four-bar linkage assemblies 28. Separate four-bar linkage assemblies 28 are provided for each wheel 30 of the vehicle. As the four-bar linkage assemblies 28 are similar except for being mirror images of one another, description will be limited to a single four-bar linkage assembly 28.

Figure 3:
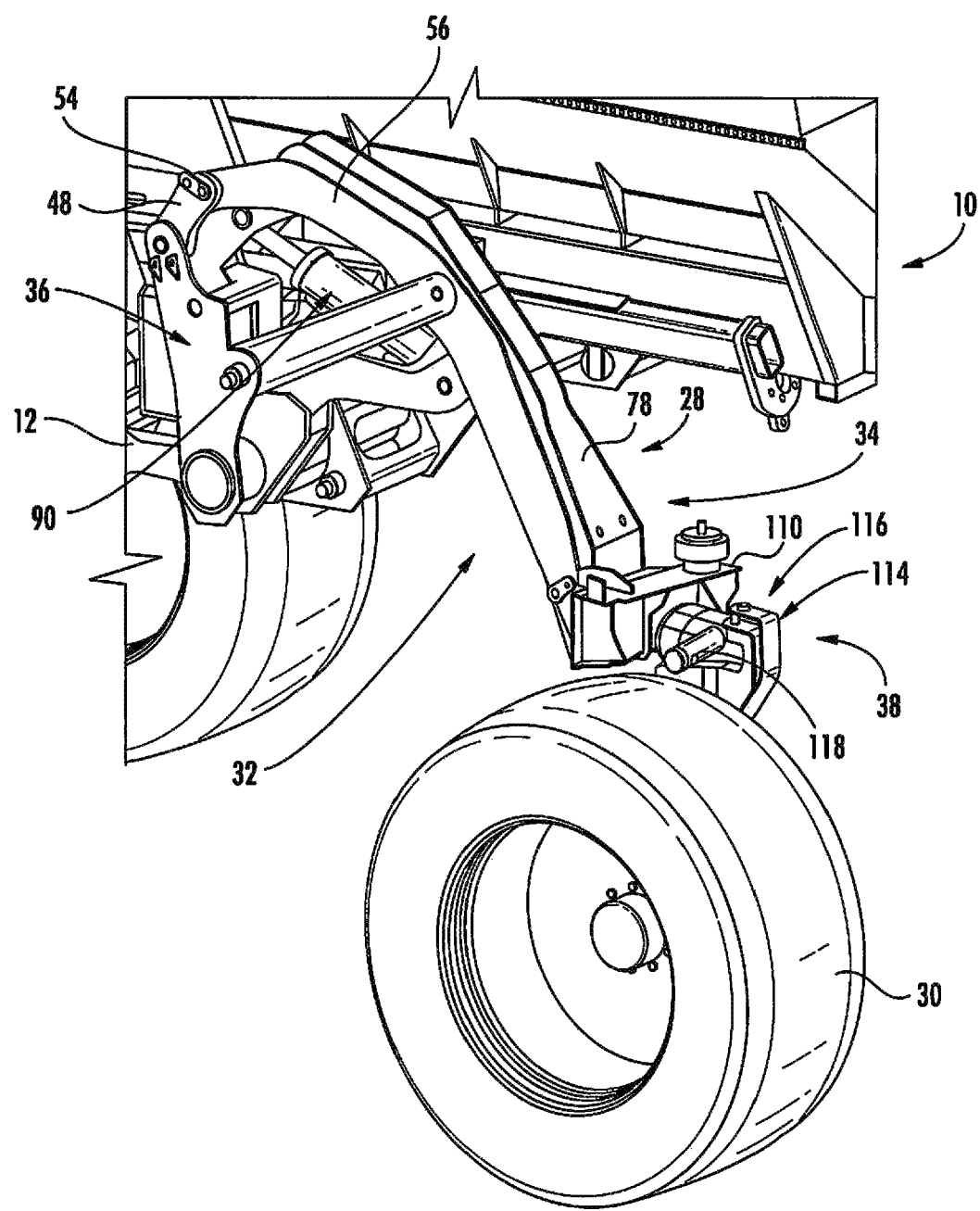
FIG. 3 illustrates a front perspective view of a height adjustment assembly in accordance with one embodiment.
Figure 4:
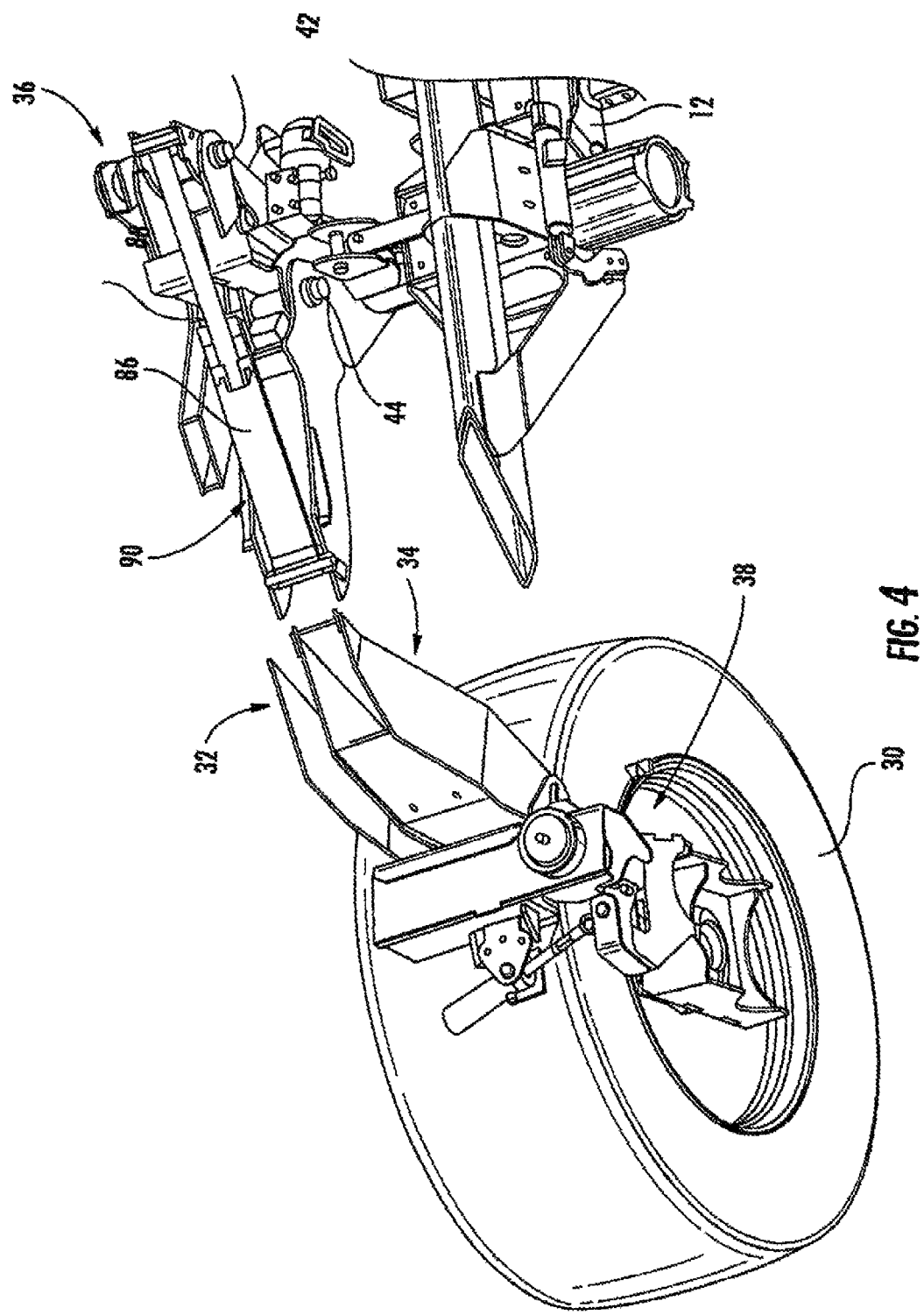
FIG. 4 illustrates a top perspective view in partial cutaway of the height adjustment assembly of FIG. 3.

As shown in FIGS. 3-4, the four-bar linkage assembly 28 includes a first linkage assembly, otherwise known as the leveling linkage 32, and a second linkage assembly, otherwise known as the lifting linkage 34. Providing the other two components of the four-bar linkage assembly are a leg support structure 36 and a leg 38. The leg support structure 36 is secured to the frame 12 and the leg 38 is coupled to the wheel 30.

Figure 5:
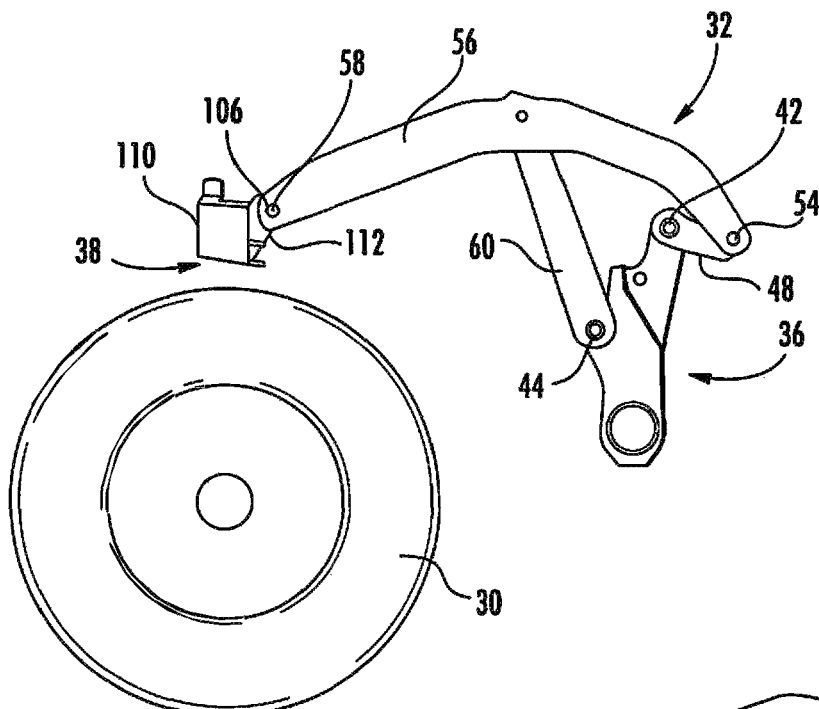
FIG. 5 illustrates a side elevation of a leveling linkage in accordance with one embodiment in the lowered position.
Figure 6:
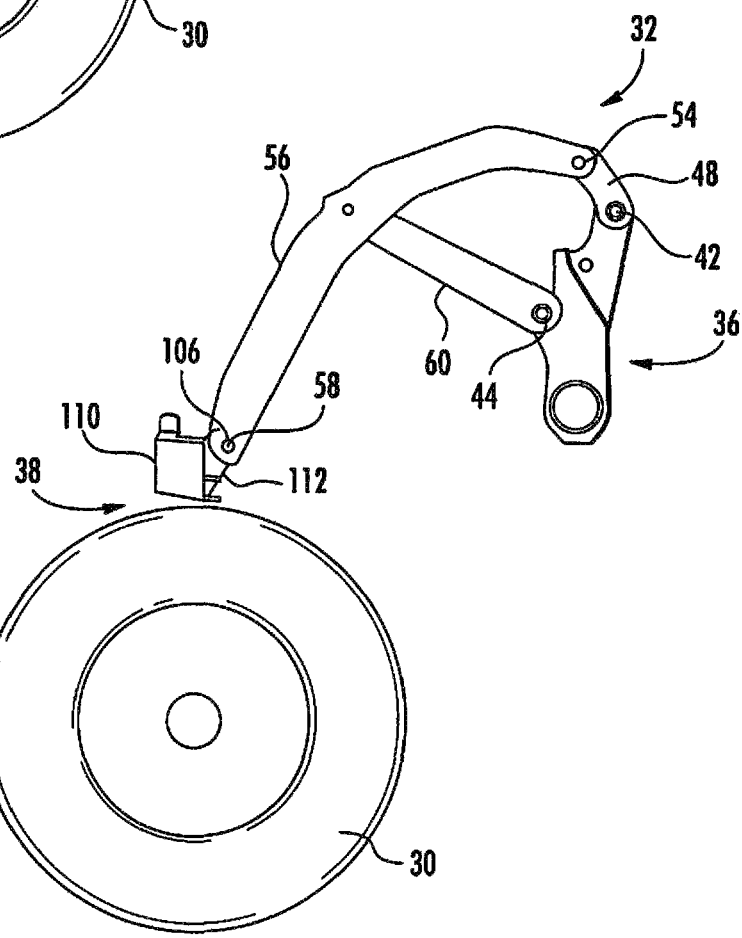
FIG. 6 illustrates a side elevation of a leveling linkage in accordance with one embodiment in the raised position.
Figure 7:
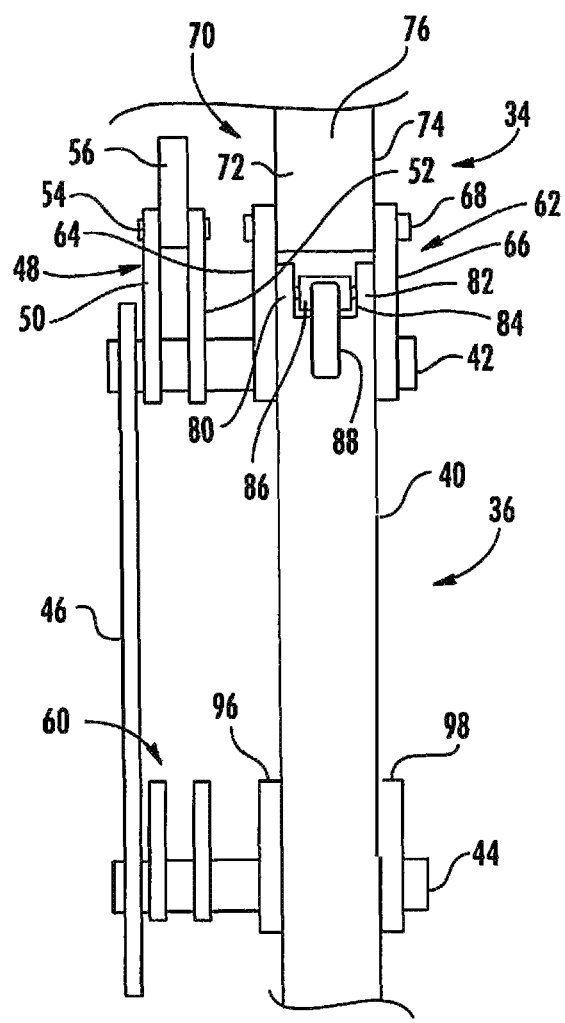
FIG. 7 illustrates a front elevation of the rear of a height adjustment assembly in accordance with one embodiment.
Figure 10:
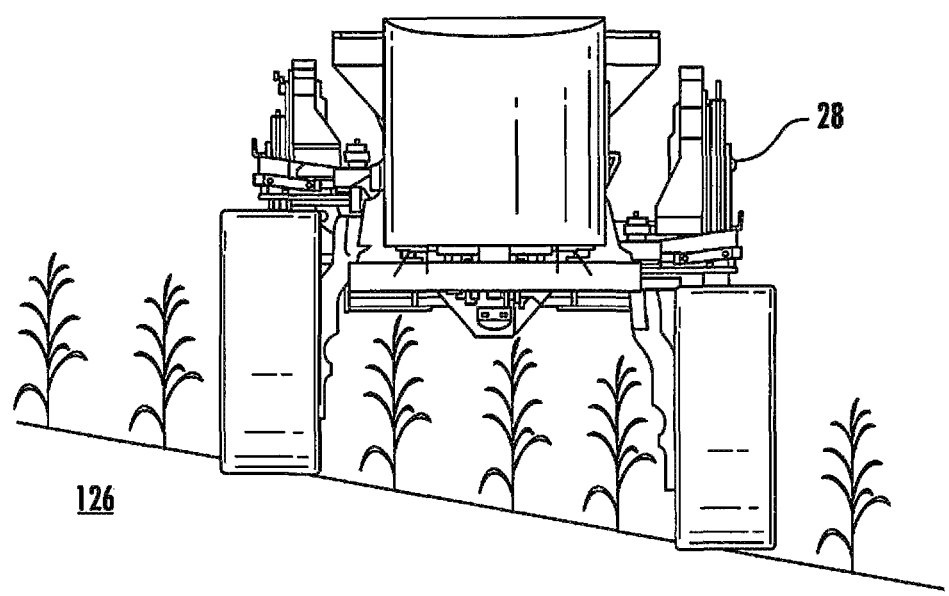
FIG. 10 illustrates a front elevation of a vehicle moving over sloped terrain in accordance with one embodiment.

The leveling linkage 32 maintains the orientation of the leg 38 and wheel 30 as the vehicle 10 is raised and lowered by the lifting linkage 34. FIGS. 1 and 5-6. The leveling linkage 32 also maintains the wheelbase and turning radius of the vehicle consistent as the vehicle 10 is raised and lowered. The leveling linkage 32 is pivotably coupled to the leg support structure 36. As shown in FIG. 7, the leg support structure 36 includes a main brace 40 secured to the frame 12. FIGS. 1, 3, 4, and 7. Coupled to the main brace 40 by a pair of pins 42 and 44 is an outer plate 46. Pivotably secured to the upper pin 42 between the main brace 40 and the outer plate 46 is a first linkage 48 including a first plate 50 and second plate 52. The first linkage 48 is coupled, in turn, by a pin 54 to a second linkage 56 as shown in FIGS. 5-6, the second linkage 56 is a long curved steel plate provided with a hole 58 so that the second linkage 56 may be connected to the leg 38 via a steering knuckle 110. The second linkage 56 is pinned to the steering knuckle 110 and the steering knuckle 110 is secured to the leg 38. As shown in FIGS. 5-10, a third linkage 60 is pivotably coupled to the pin 44 between the main brace 40 and outer plate 46. The third linkage 60 is pivotably coupled on its opposite end to the second linkage (56) at a point between the first linkage (48) and the leg (38).

The lifting linkage 34 includes a fourth linkage 62 having a first plate 64 and second plate 66 pivotably secured to the pin 42 on opposite sides of the main brace 40. FIGS. 3-5, and 7-10. The fourth linkage 62 is coupled in turn, by a pin 68 to a fifth linkage 70. The fifth linkage 70 may be of any desired design. In the preferred embodiment, the fifth linkage 70 has a pair of side plates 72 and 74 welded to a bottom plate 76 and a top plate 78. The fifth linkage 70 preferably tapers in width from the leg 38 toward the fourth linkage 62.

As shown in FIG. 7, the main brace 40 is provided with a pair of ears 80 and 82 to hold a pin 84. Provided around the pin 84 is a sleeve 86 coupled to a piston rod 88 of a linear actuator such as a hydraulic cylinder 90. FIGS. 7-9. The cylinder barrel 92 of the hydraulic cylinder 90 is pivotably secured to a sixth linkage the sixth linkage 94 is a pair of plates 96 and 98 coupled around the pin 44 on either side of the main brace 40. The sixth linkage 94 is coupled on its other end to either side of the fifth linkage 70 via a pin 100 located between the ends of the fifth linkage 70. Unlike the third linkage 60, which is straight, the sixth linkage 94 is preferably provided with a curve 102 to allow for a longer hydraulic cylinder 90 to be located between the leg support structure 36 and sixth linkage 94. The hydraulic cylinder 90 is coupled to the hydraulic pumps 16 by means known in the art.

The four-bar linkage assembly 28 is coupled to the leg 38 by two pins 104 and 106 FIGS. 5-9. The first pin 104 is secured between two steel ears 108 welded to a steering knuckle 110. The pin 104 passes through the fifth linkage 70 that is provided between the ears 108. The other pin 106 is secured to another ear 112 welded to the steering knuckle 110. The second linkage 56 is secured to the steering knuckle 110 at a higher point than the fifth linkage 70 to allow the second linkage 56 and fifth linkage 70 to act as parallel linkages to raise and lower the vehicle 10 without increasing the wheelbase FIGS. 3-9. The leg 38 includes the steering knuckle 110 the depending shaft/sleeve assembly 114 pivotably coupled thereto and the turning assembly 116 that includes a hydraulic cylinder 118 to pivot the shaft within the sleeve to turn the wheel 30 coupled to the shaft. The hydraulic cylinder 118 is coupled to the hydraulic pump 16 in a manner such as that known in the art.

By providing the turning assembly 116 between the suspension and the wheel, complicated prior art steering system linkage assemblies can be eliminated. Additionally, by providing the turning assembly 116 below the suspension, steering tolerances are tighter making the vehicle 10 easier to manage and allowing auto-steer systems to function more efficiently. Using the four-bar linkage described above allows a smaller hydraulic cylinder to lift the vehicle 10 a greater distance. In the preferred embodiment, the hydraulic cylinder is preferably a 61-centimeter hydraulic cylinder, which lifts the vehicle 10 122 centimeters. Alternatively, any desired length of cylinders may be used from below 10 centimeters to in excess of 2 meters in length, depending on the application. Similarly, while in the preferred embodiment, the length of the cylinder to the lift height of the vehicle is 1 to 2, the angles and connection points of the four-bar linkage 28 may be modified to create a lift ratio anywhere from above 1 to 1, to 1 to 3 or more. The four-bar linkage assembly of the present invention also allows for four-wheel independent suspension and a large under vehicle clearance that eliminates axles spanning the complete width of the vehicle. While the linkages of the four-bar linkage 28 in the preferred embodiment are steel, they may be constructed of any desired dimensions or material.

When it is desired to operate the vehicle 10 of the preferred embodiment, the user 20 manipulates the control panel 22 to direct hydraulic fluid from the hydraulic pump 16 to the hydraulic cylinders 90. The hydraulic cylinders 90 push the ends of the sixth linkages 94 away from the main braces 40, causing the fourth linkages to rotate around the main braces 40. This pushes the fourth linkages 62 downward in a straight line, thereby raising the vehicle 10 without changing the length of the wheelbase of the vehicle 10. When it is desired to lower the vehicle 10, the user 20 manipulates the control panel 22 to return hydraulic fluid from the hydraulic cylinders 90, thereby contracting the hydraulic cylinders 90, drawing the ends of the sixth linkages 94 toward the main brace 40 and rotating the fourth linkages 62 in the opposite direction. This draws the fifth linkages 70 upward, lowering the vehicle 10 without changing the length of the wheelbase 120.

As shown in FIG. 1, the vehicle 10 may also be provided with an electronic control unit (ECU) 122 such as those known in the art. The electronic control unit 122 may be coupled to various other systems such as global positioning satellites, gyroscopic, or laser systems to monitor the ground 124. The ECU 122 may be programmed to maintain the vehicle 10 level even when the vehicle 10 is moving across uneven terrain 126 in a manner such as that shown in FIG. 10. As shown, either the user 20 or the Electronic Control Unit 122 may extend the four-bar linkage assemblies 28 on one side of the vehicle 10 and retract the four-bar linkage assemblies 28 on the opposite side of the vehicle 10 to allow the vehicle 10 to move along a slope while maintaining the vehicle 10 level. This type of maneuver is especially advantageous for vehicles carrying a large shifting weight and/or vehicles with a high center of gravity.

Figure 11:
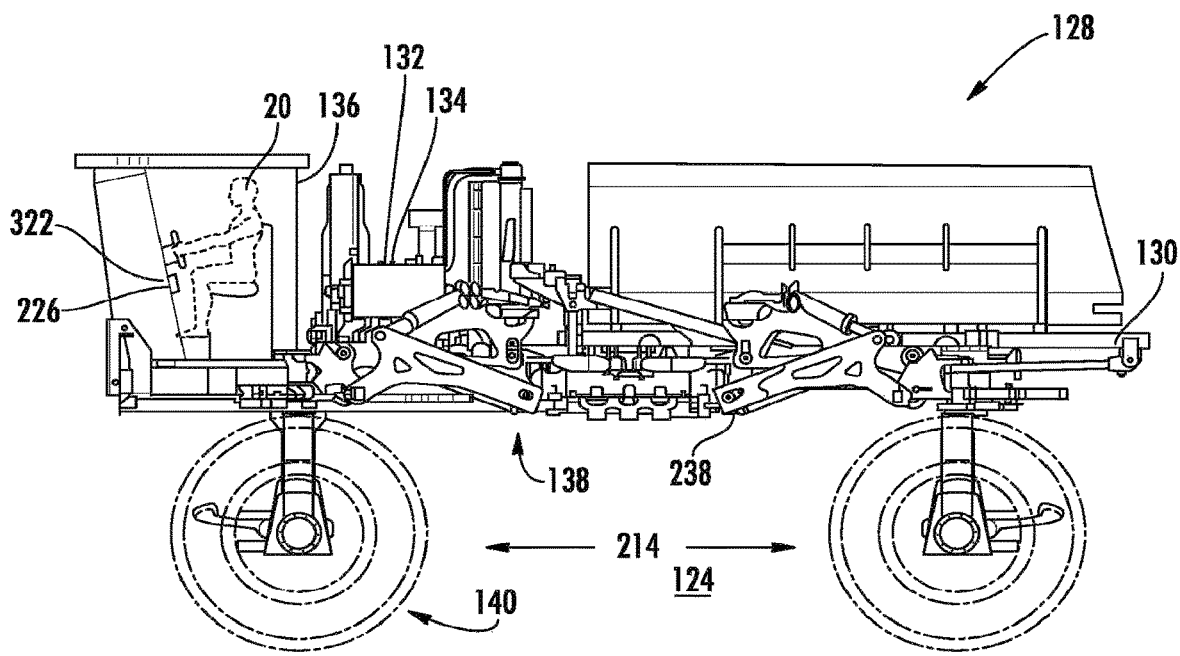
FIG. 11 illustrates a side elevation of an alternative embodiment of the vehicle with the vehicle in the lifted position.

An alternative embodiment of the variable height vehicle is shown generally as 128 in FIG. 11. The vehicle 128 is provided with a frame 130 coupled to an engine 132 a hydraulic pump 134 and an operator station 136 as in the above embodiment, the vehicle 128 is lifted and lowered by a plurality of closed chain linkages, which are preferably four bar linkage assemblies 138. Separate four bar linkage assemblies 138 are provided for each wheel 140 of the vehicle 128. As the four bar linkage assemblies 138 are similar, except for being mirror images of one another, description will be limited to a single four bar linkage assembly 138.

Figure 13:
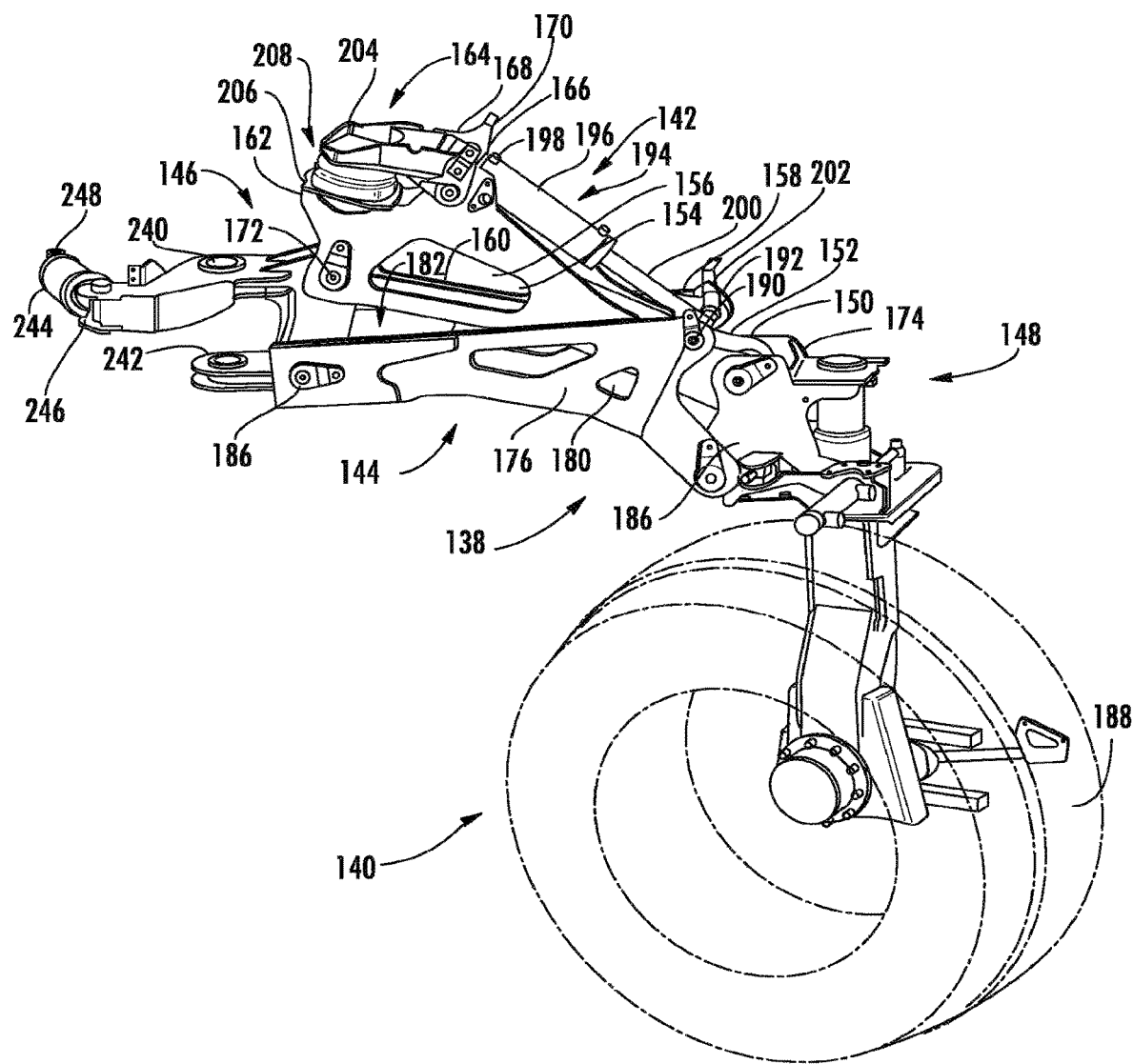
FIG. 13 illustrates a front perspective view of the height adjustment assembly of the vehicle of FIG. 11.
Figure 14:
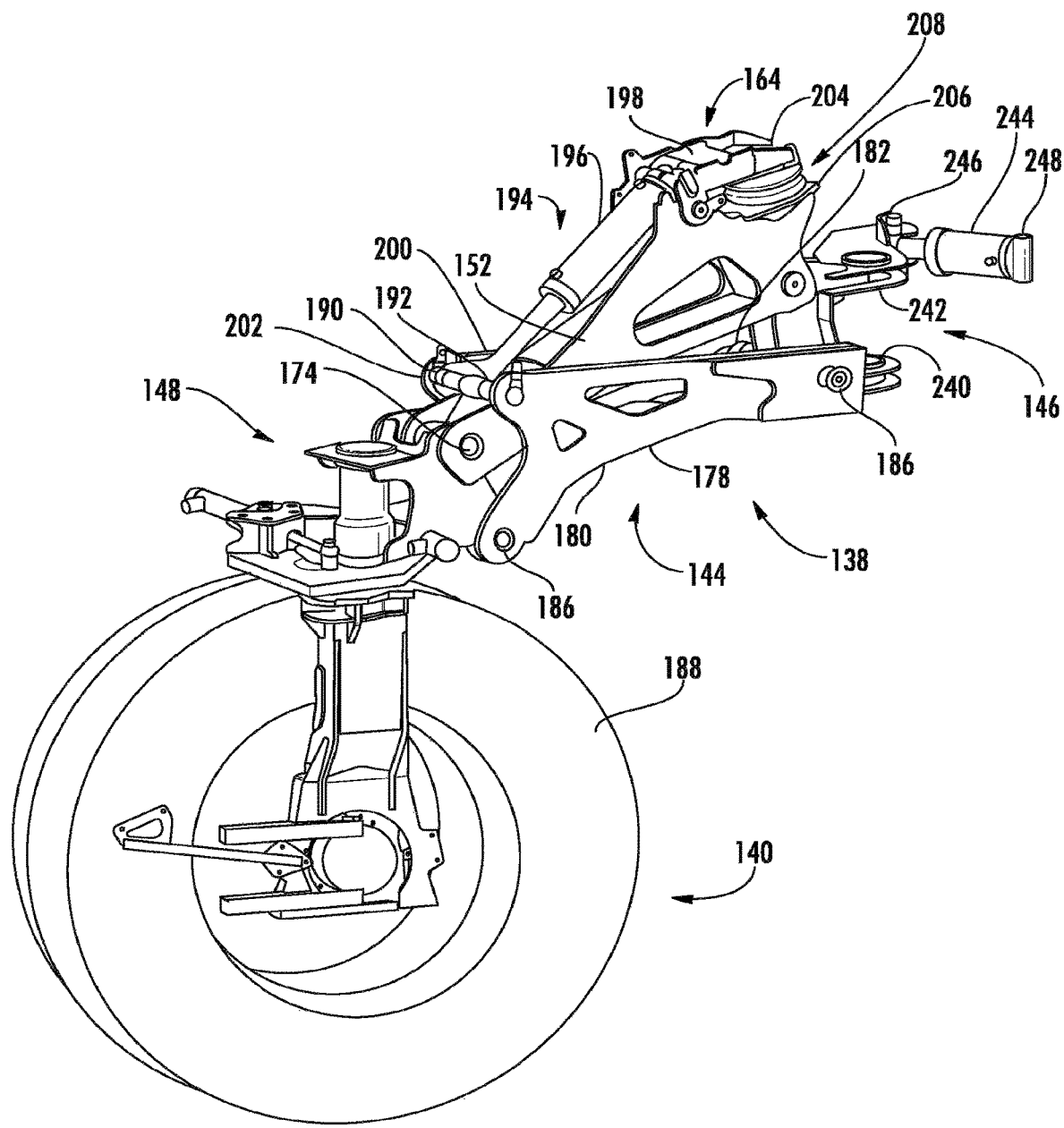
FIG. 14 illustrates a front perspective view of the height adjustment assembly of FIG. 13 from the interior.
Figure 15:
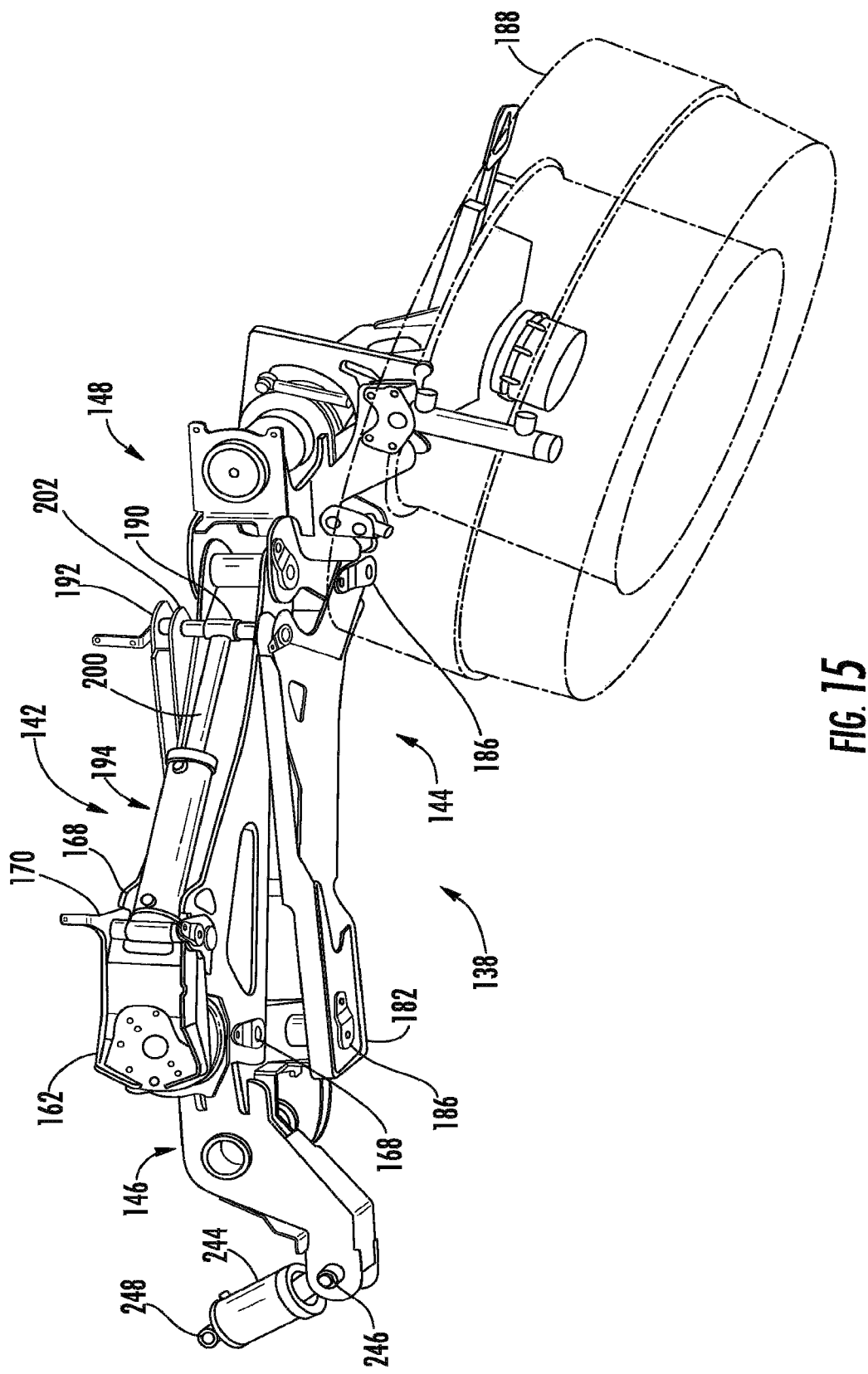
FIG. 15 illustrates a top perspective view of the height adjustment assembly of FIG. 11.

As shown in FIGS. 13-15, the four bar linkage assembly 138 is a closed chain linkage having a first arm 142 and a second arm 144. The remaining linkages in the four bar linkage assembly 138 are the frame bracket 146 and leg bracket 148. As shown in FIGS. 13-15, the first arm 142 has two generally triangular side plates 150 & 152 having triangular cutouts 154 & 156. The side plates 150 & 152 are each welded to a top steel plate 158 a bottom steel plate 160 and a back steel plate 162. The top steel plate 158 is welded to the side plates 150 & 152. A suspension conductor, such as a pivotable plate 164 is pivotably coupled to the side plates 150 & 152 of the first arm 142 by a pin 166. The pivotable plate 164 defines a pair of ears 168 & 170 that extend beyond the top steel plate 158. The first arm 142 is pivotably secured on either side of the frame bracket 146 by a pin 172 passing through the side plates 150 & 152 and the frame bracket 146. The first arm 142 is pivotably secured on its opposite end to the leg bracket 148. The side plates 150 & 152 of the first arm 142 are provided on the interior of the leg bracket 148 and pivotably secured thereto by a pin 174.

Figure 16:
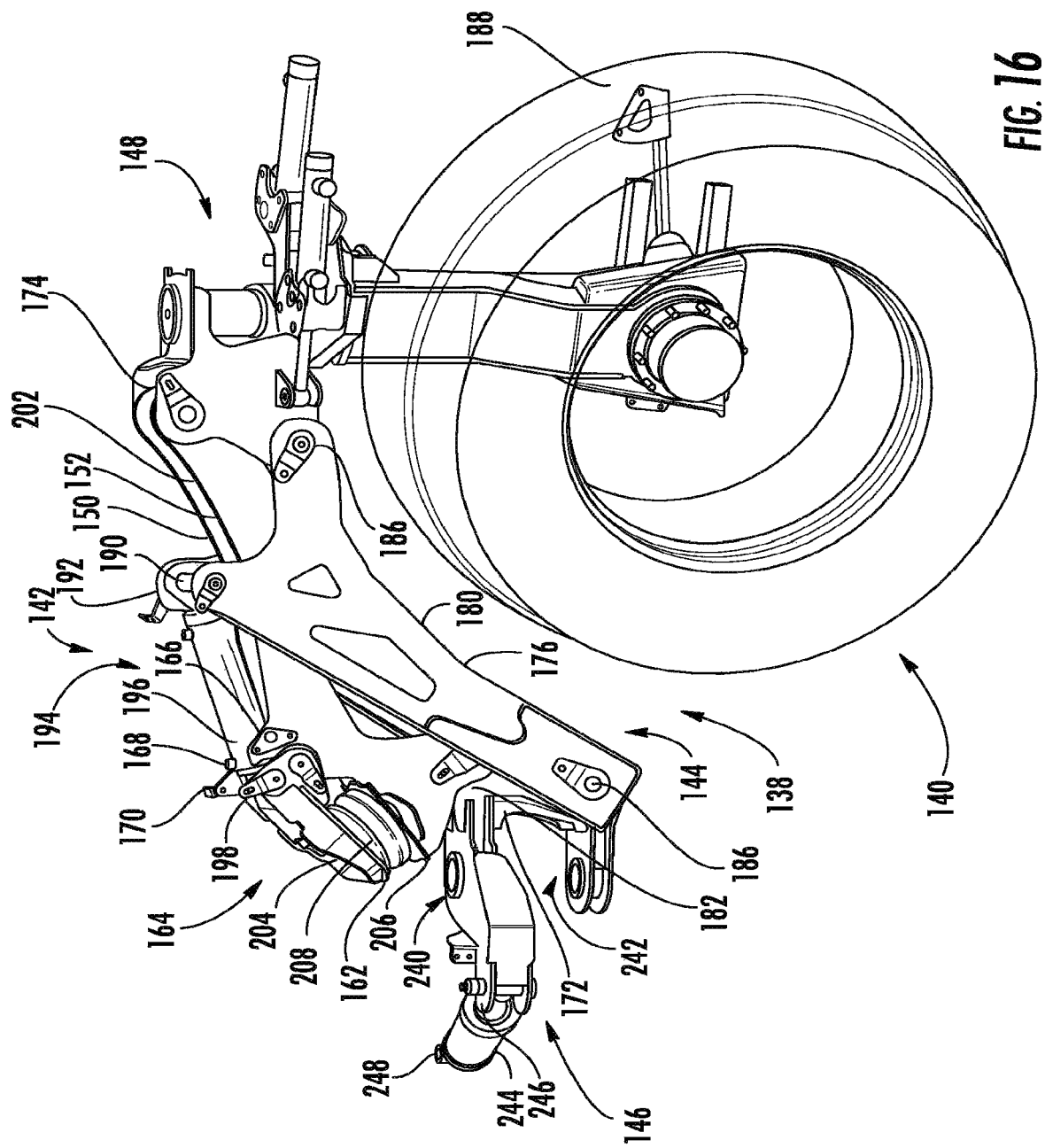
FIG. 16 illustrates a front perspective view of the height adjustment assembly of the vehicle of FIG. 11 in the lowered position.
Figure 17:
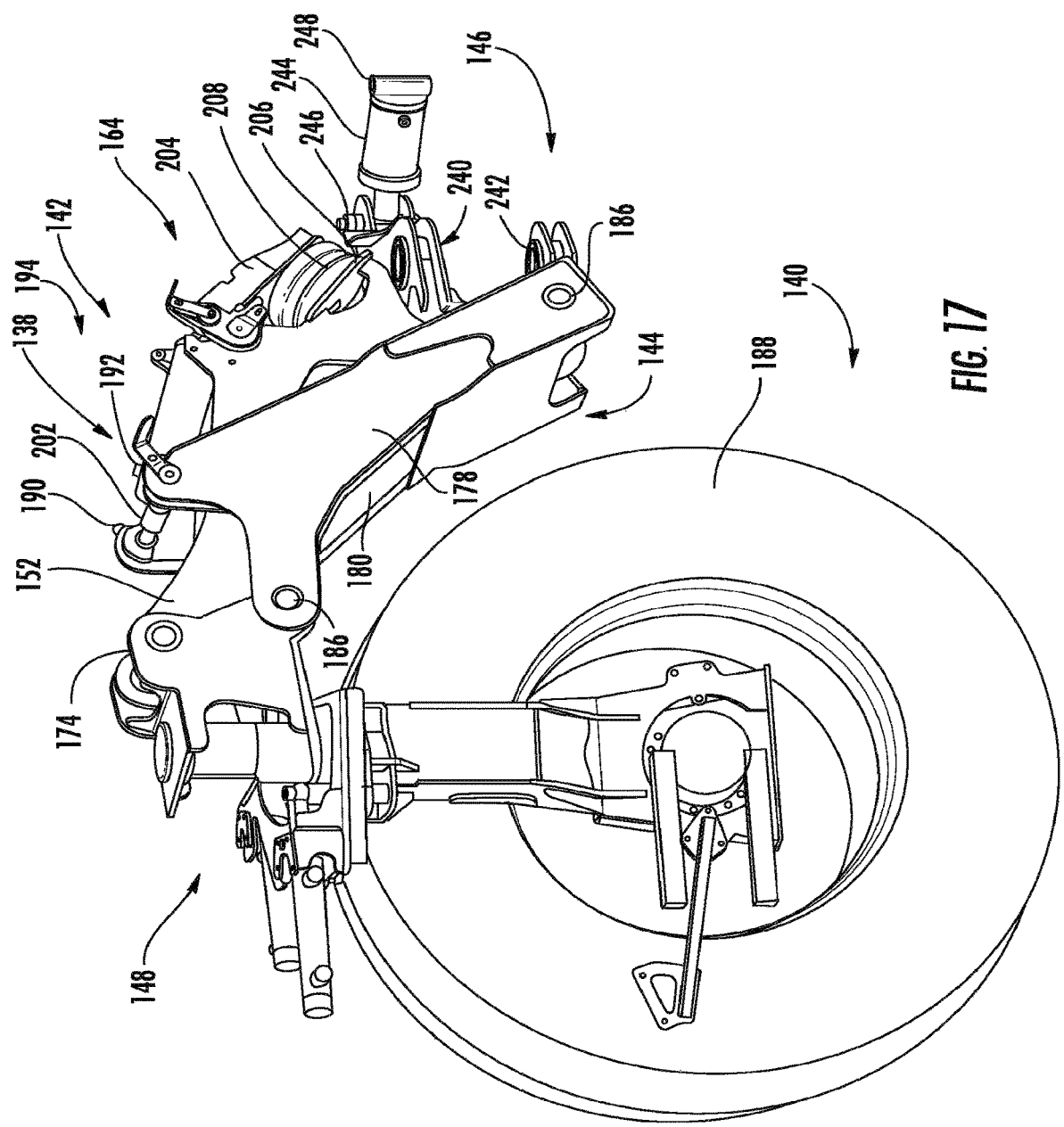
FIG. 17 illustrates a front perspective view of the height adjustment assembly of FIG. 13 from the interior in the lowered position.
Figure 18:
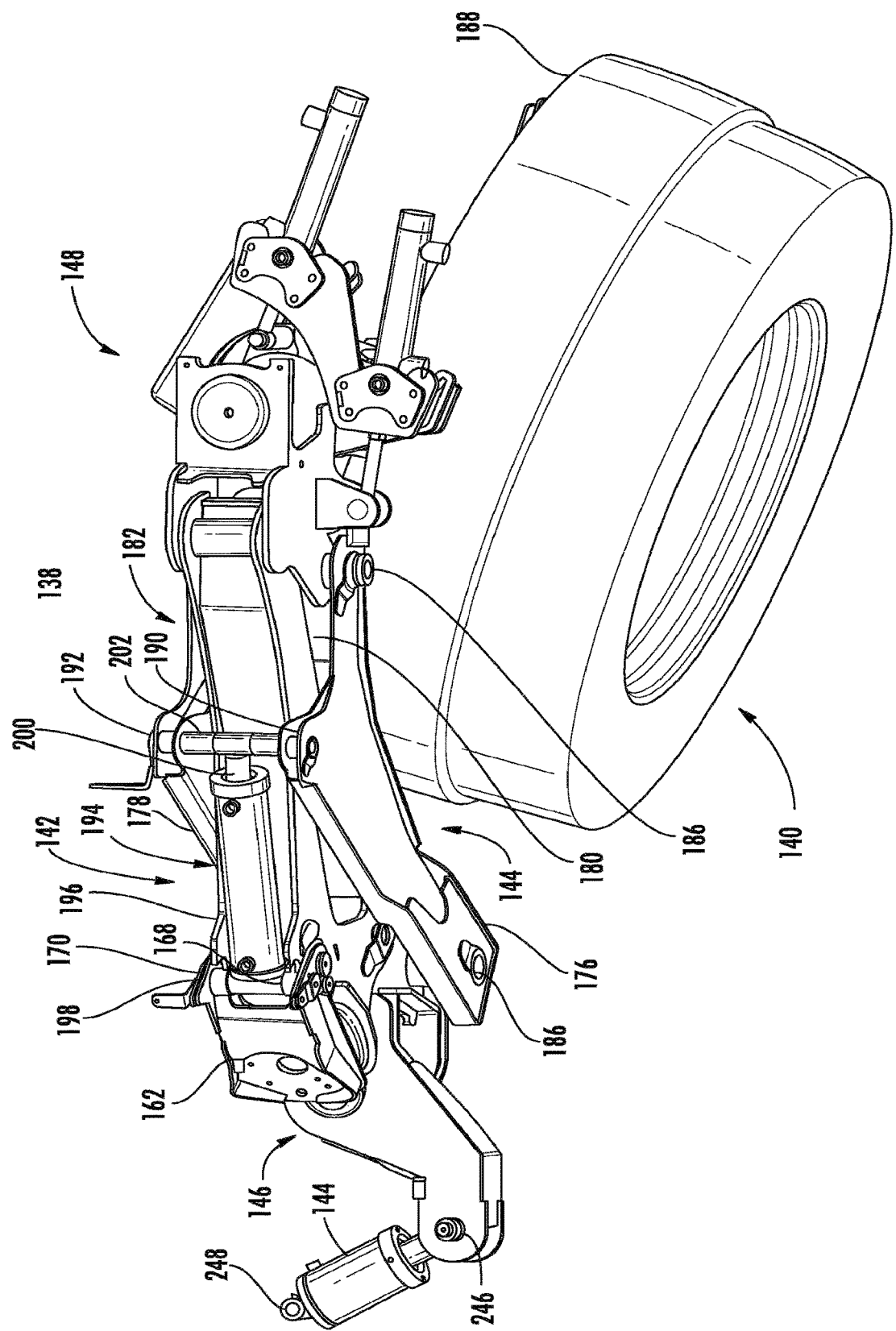
FIG. 18 illustrates a top perspective view of the height adjustment assembly of FIG. 11 in the lowered position.

The second arm 144 is also provided with two side plates 176 & 178 constructed of steel and each welded to a bottom plate 180 to define an interior 182. The frame bracket 146 is provided within this interior 178 and pivotably secured to the side plates 176 & 178 by a pin 184. Similarly, the leg bracket 148 is also provided within this interior 178 of the second arm 144 and secured thereto by a pin 186. As shown in FIG. 16 the second arm 144 is preferably sufficiently curved to allow clearance for the tire 188 when the vehicle 10 is in the lowered position. The second arm 144 is preferably sufficiently curved so that at least one point along a straight line between the pins 184 & 186 is unobstructed by the second arm 144.

As shown in FIG. 13, the side plates 176 & 178 define ears 190 & 192 that extend above the first arm 142. A linear actuator 194, which in the preferred embodiment is a hydraulic cylinder, is coupled between the pivotable plate 164 and second arm 144. The barrel end 196 of the linear actuator 194 is pivotably coupled to the ears 168 & 170 of the pivotable plate 164 by a pin 198. The rod end 200 of the linear actuator 194 is pivotably coupled to the ears 190 & 192 of the second arm 144 by a pin 202 located above the first arm 142. The pivotable plate 164 defines a flat steel plate 204. A steel airbag receiver plate 206 is welded or otherwise secured to the first arm 142 and an airbag 208, such as those known in the art, is secured between the flat steel plate 204 of the pivotable plate 164 and the airbag receiver plate (206). The airbag 208 may be any fluid-filled resilient container, but is preferably an airspring with an elastomeric bellows constructed from rubber reinforced with two plies of cord fabric and having round metal plate end closures such as a Firestone® Airmount Actuator 233-2 style bellows, distributed by Firestone Industrial Products Company. The airbag 208 isolates and dampens vibration between the first arm 142 and the second arm 144 as the vehicle 128 starts or stops, or moves over uneven terrain 210. As shown, the pin 202 and top portion of the ears 190 & 192 remain above the first arm 142 as the first arm 142 and the second arm 144 move in relation to one another.

Preferably, the airbag 208 is coupled to the linear actuator 194 to provide suspension for the vehicle 128. The linear actuator 194 is provided with an accumulator in a manner such as that known in the art to allow the linear actuator 194 to isolate and dampens vibration between the first arm 142 and the second arm 144 as the vehicle 128 starts or stops, or moves over uneven terrain 210. The airbag 208 and linear actuator 194 are coupled to each other by opposite ends of the pivotable plate 164, which is connected to, and seesaws relative to, the first arm 142. As shown in FIG. 13, the pivotable plate 164 is pivotably coupled at a pivot point to and anchor, such as the first arm 142. The first end, or flat steel plate 204 end, of the pivotable plate 164 is coupled to the airbag 208, while the second end, or ears 168 & 170 end, of the pivotable plate 164 is pivotably coupled to the linear actuator 194. As the vehicle 128 moves, both the airbag 208 and linear actuator 194 act against the seesawing pivotable plate 164 to absorb vibration transfer between the first arm 142 and the second arm 144. Alternatively, if desired, the pivotable plate 164, steel airbag receiver plate 206, and airbag 208 may be eliminated and the linear actuator 194 may be coupled directly between the first arm 142 and the second arm 144. In this embodiment, the suspension may be eliminated, or a prior art suspension system, such as providing the linear actuator 194 with an accumulator, such as those known on the art, may allow the linear actuator 194 to be used for suspension.

Figure 12:
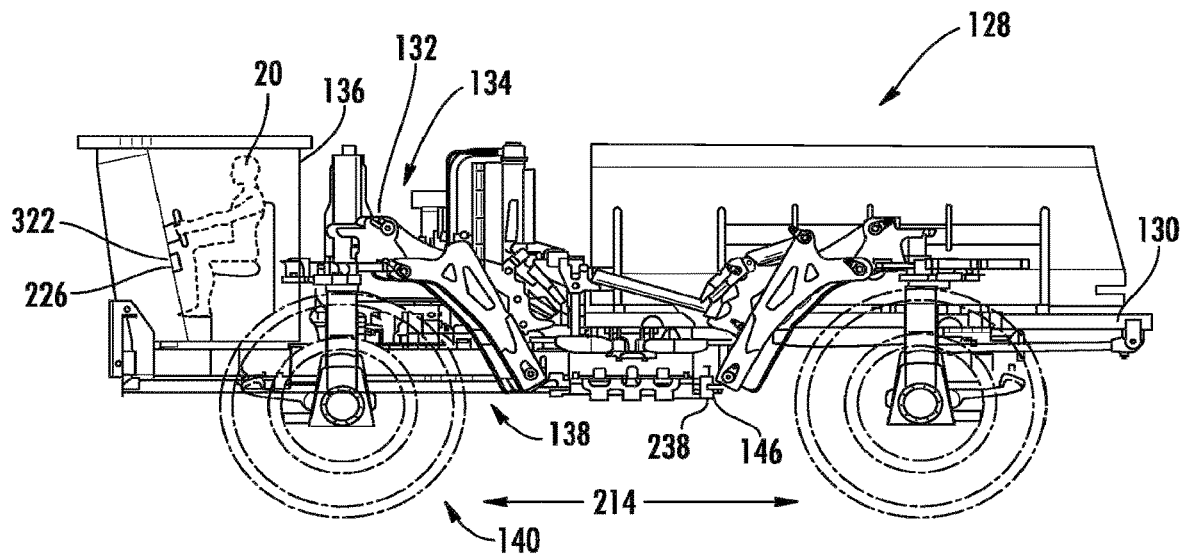
FIG. 12 illustrates the vehicle of FIG. 11 in the lowered position.

When it is desired to operate the vehicle 128, the user 20 manipulates a control panel 226 to direct hydraulic fluid from the hydraulic pump 134 to the linear actuator 194. FIGS. 11-14. The linear actuator 194 pushes the rod end 200 away from the barrel 196 thereby moving the ears 190 & 192 of the second arm 144 away from the ears 168 & 170 of the pivotable plate 164 of the first arm 142. As shown in FIG. 13, this causes the second arm 144 to rotate clockwise, lifting the frame bracket 146 relative to the leg bracket 148, and thereby lifting the frame 130 above the ground 124. As shown in FIGS. 11 & 12, raising the frame 130 of the vehicle 128 relative to the ground 124 also increases the size of the wheelbase 214 of the vehicle 128. When it is desired to lower the vehicle 128 the user 20 manipulates the control panel 226 to return hydraulic fluid from the linear actuator 194, thereby drawing the ears 190 & 192 of the second arm 144 toward the ears 168 & 170 of the pivotable plate 164. This causes the second arm 144 to rotate in a counter-clockwise direction, lowering the vehicle 128 while reducing the length of the wheelbase 214. While the linear actuator 194 may be used alone to control the suspension of the vehicle 128 using a "float" mode in a manner such as those known in the art, in the preferred embodiment the airbag 208 is used for suspension in addition to the float of the linear actuator 194. Alternatively, the hydraulic cylinder 194 may be locked in place to maintain a gross height of the vehicle 128 while the airbag 208 controls the suspension of the vehicle 128.

As shown in FIG. 13, a steering assembly 228 is coupled to the leg bracket 148 to allow the user 20 to steer the vehicle 128 independently of the four bar linkage assembly 138 and the suspension of the vehicle 128. While the four bar linkage assembly 138 may be provided in any desired configuration, in the preferred embodiment the first arm 142 is coupled to the frame bracket 146 at a point higher than the point at which the second arm 144 is coupled to the frame bracket 146. Similarly, the first arm 142 is coupled to the leg bracket 148 at a point above the point at which the second arm 144 is coupled to the leg bracket 148.

While the vehicle 128 and four bar linkage assembly 138 may be provided with any desired dimensions, in the preferred embodiment the four bar linkage assembly 138 is designed to change the ground clearance of the frame 130 from 107 cm to 244 cm, allowing for a height change of 137 cm. The four bar linkage assembly 138 is preferably designed to change the ground clearance of the frame 130 at least 50 centimeters (cm), more preferably at least 80 cm and most preferably at least 100 cm. Preferably the four bar linkage assembly 138 is designed to at least double the ground clearance of the frame 130. As shown in FIGS. 11 & 12, the front and rear linkage assemblies 138 are preferably provided along the same plane in mirrored orientation relative to one another. If desired, the linkage assemblies 138 may be oriented in a non-planar orientation. The two front linkage assemblies 138 are preferably provided on opposite sides of the frame 130 in a mirror orientation relative to one another. The two rear linkage assemblies 138 are also preferably provided on opposite sides of the frame 130 in a mirror orientation relative to one another. If desired however, the linkage assemblies 138 may be oriented in a non-planar orientation and/or staggered orientation relative to one another.

Figure 19:
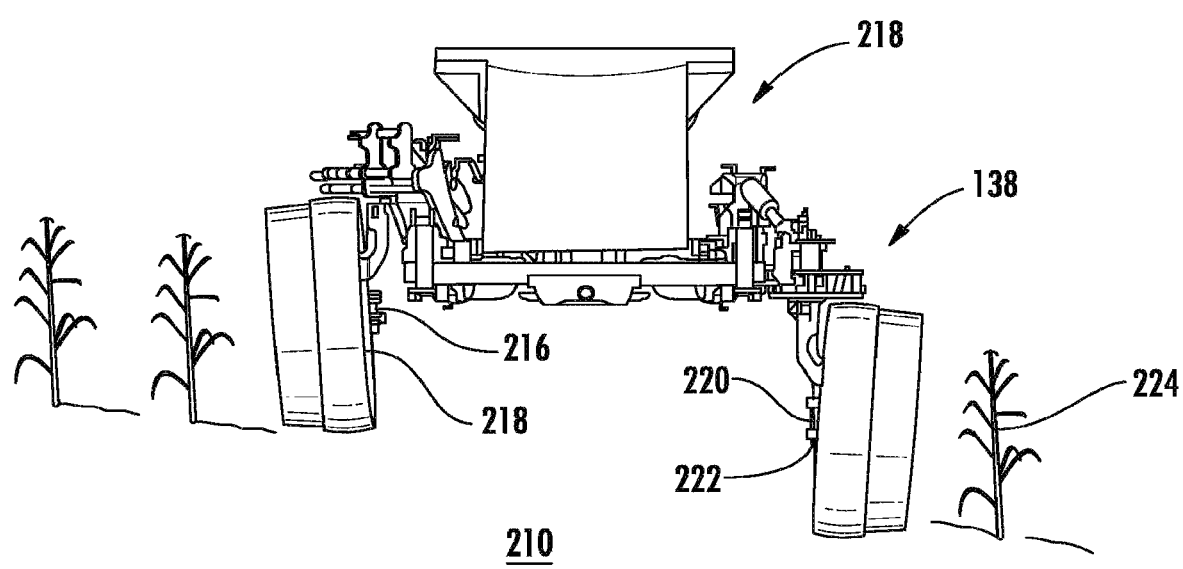
FIG. 19 illustrates a front elevation of the vehicle of FIG. 11 moving over sloped terrain.

As shown in FIG. 19, the four bar linkage assemblies 138 may be operated independently to allow the vehicle 128 to follow the contour of the uneven terrain 210 while maintaining the frame 130 level. As shown in FIG. 19, the linkage assemblies 138 are oriented in a manner such that even when traversing uneven terrain 210 a line drawn from the midline 216 of the left rear wheel 218 to a midline 220 of the right rear wheel 222 is unobstructed to allow for the passage of crops 224 underneath.

As shown in FIGS. 11-18, four bar linkage assembly 138 is pivotably coupled to the frame 130 of the vehicle 128 by a pin 238 passing through two holes 240 & 242 in the frame bracket 146 and a hole (not shown) in a portion of the frame 130 provided between the holes 240 & 242. A journal actuator such as a hydraulic cylinder 244 is pivotably coupled to both the frame bracket 146 and frame 130 by a pair of pins 246 & 248. As explained in more detail below, as the hydraulic cylinder 244 is actuated, the four bar linkage assembly 138 pivots relative to the frame 130 moving the wheel 140 alternately closer and further away from the frame 130 changing the tread width 250 of the vehicle 128. FIGS. 11-18 and 26-27.

Figure 20:
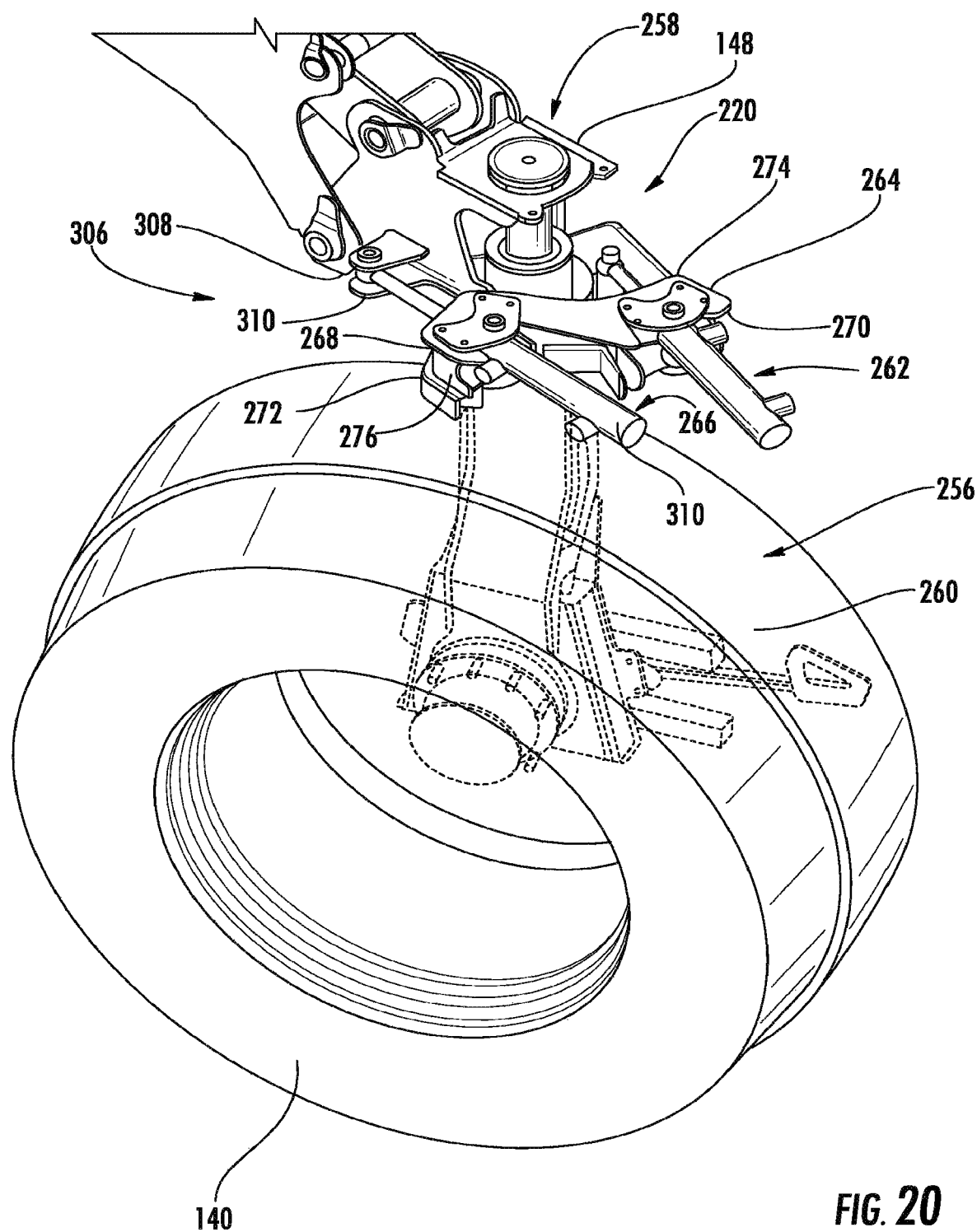
FIG. 20 illustrates a top perspective view in partial phantom of the toe adjust assembly of the vehicle of FIG. 11.
Figure 21:
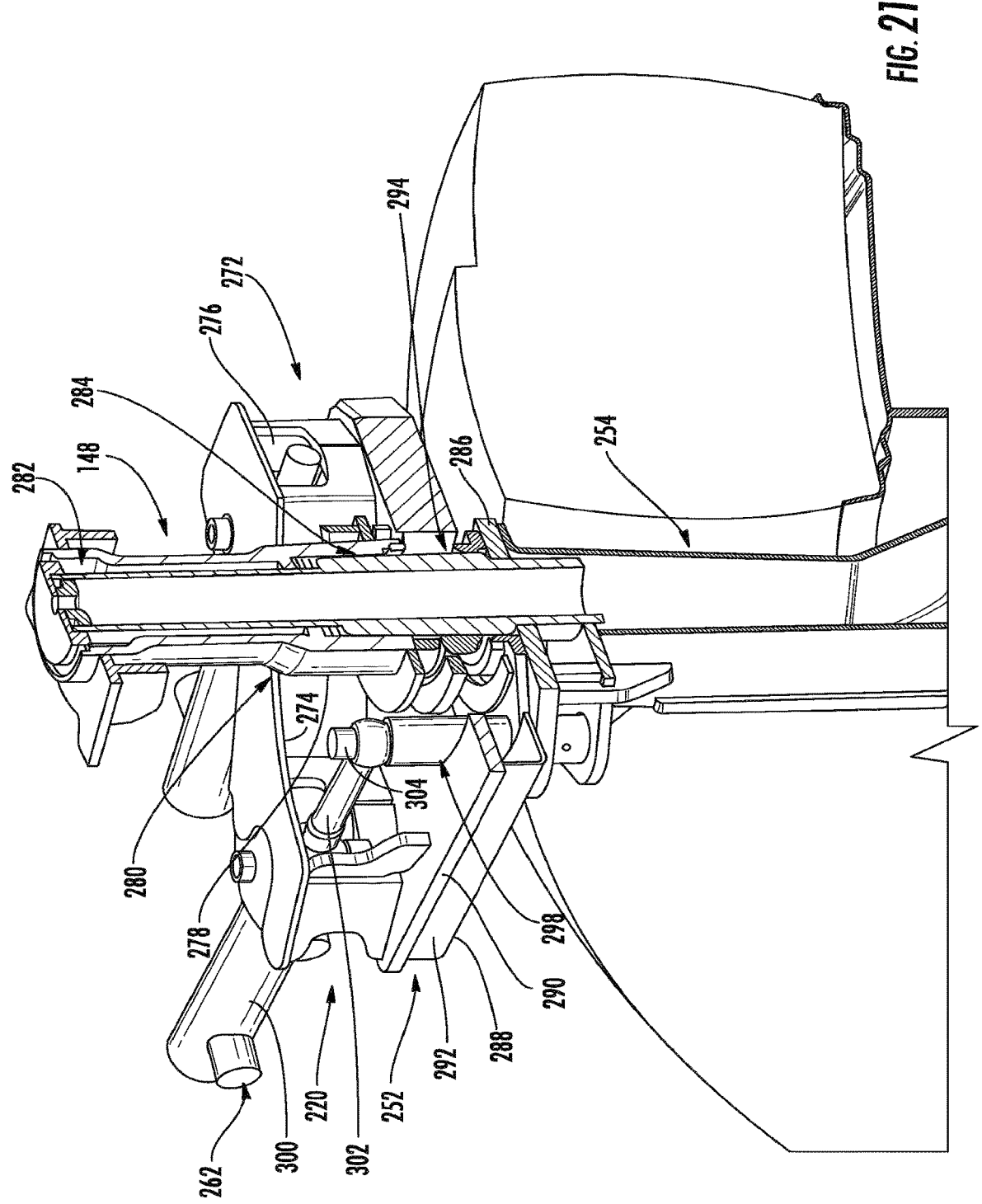
FIG. 21 illustrates a side perspective view in partial phantom of the toe adjust assembly of FIG. 11.

As shown in FIG. 20, the turning assembly 220 has a connector such as a steering plate 252 that is provided around a leg 254 of the vehicle 128 like a sleeve, with freedom to move vertically relative to the sleeve. The leg 254 has a first end 256 and a second end 258. The first end of the leg 254 is journaled to the wheel 140 a hydraulic motor 260 is provided on the first end 256 of the leg 254 to drive the wheel 140 in a manner such as that known in the art. A linear actuator such as a hydraulic cylinder 262 is pivotably secured to the steering plate 252 by a trunion 264. A second actuator such as a hydraulic cylinder 266 is also pivotably secured to the steering plate 252 by trunion 268. As shown in FIG. 21 two steel housing assemblies 270 & 272 are welded or otherwise secured to the steering plate 252. A steel bracket 274 is belted or otherwise secured to the tops of both housing assemblies 270 & 272. Provided within the housing assembly 270 is the hydraulic cylinder 262 pivotably coupled by the trunion 264 to both the steering plate 252 and bracket 274. Similarly, provided within the housing assembly 272 is the hydraulic cylinder 266 pivotably coupled by the trunion 268 to both the steering plate 252 and bracket 274. The housing assemblies 270 & 272 are provided with openings 276 on both the front and back to allow the hydraulic cylinders 262 & 266 to extend therethrough. The openings 276 are preferably wide enough to accommodate the hydraulic cylinders 262 & 266 through their full ranges of motion.

As shown in FIG. 21 the leg 254 defines a ledge 278 upon which is provided an axial thrust bearing 280. Resting on top of the axial thrust bearing 280 is the leg bracket 148. Also provided between the second end 258 of the leg 254 and the leg bracket 148 are a pair of radial bearings 282 & 284 that allow the leg 254 to rotate relative to the leg bracket 148. The axial thrust bearing 280 bears the majority of the downward pressure of leg bracket 148 on the ledge 278 of the leg 254 allowing the radial bearings 282 & 284 to rotate more freely.

The leg 254 is also provided with a shelf 286 on which rests the steering plate 252. The steering plate 252 as shown has a bottom steel plate 288 and a top steel plate 290 connected to one another by one or more side plates 292. The steering plate 252 may be formed from a single sheet of stamped steel or may be a plurality of parts welded together. Provided between the bottom steel plate 288 and the top steel plate 290 is a radial bearing 294 provided around the leg 254 in a manner that allows the steering plate 252 to freely rotate around the leg 254. The steering plate 252 is provided with a cutout 296 to accommodate a steel bar 298 bolted, welded or otherwise secured to the shelf 286. The cutout 296 is preferably configured to accommodate the steel bar 298 across the full range of the steering plates 252 motion. Whereas the barrel 300 of the hydraulic cylinder 262 is pivotably coupled to the housing assembly 270 by the trunion 264, the rod, 302 of the hydraulic cylinder 262 is pivotably coupled to the steel bar 298 by a pin 304 passing through the rod 302.

As shown in FIG. 20, the leg bracket 148 is provided with an ear 306. The ear 306 has a top steel plate 308 and bottom steel plate 310 welded or otherwise secured to the leg bracket 148. While the barrel 312 of the hydraulic cylinder 266 is pivotably coupled to the housing assembly 272 by the trunion 268, the rod 214 of the hydraulic cylinder 266 is pivotably coupled to the leg bracket 148 by a pin 316 coupled to the stop steel plate 308 and bottom steel plate 310 and passing through the rod 314.

Figure 22:
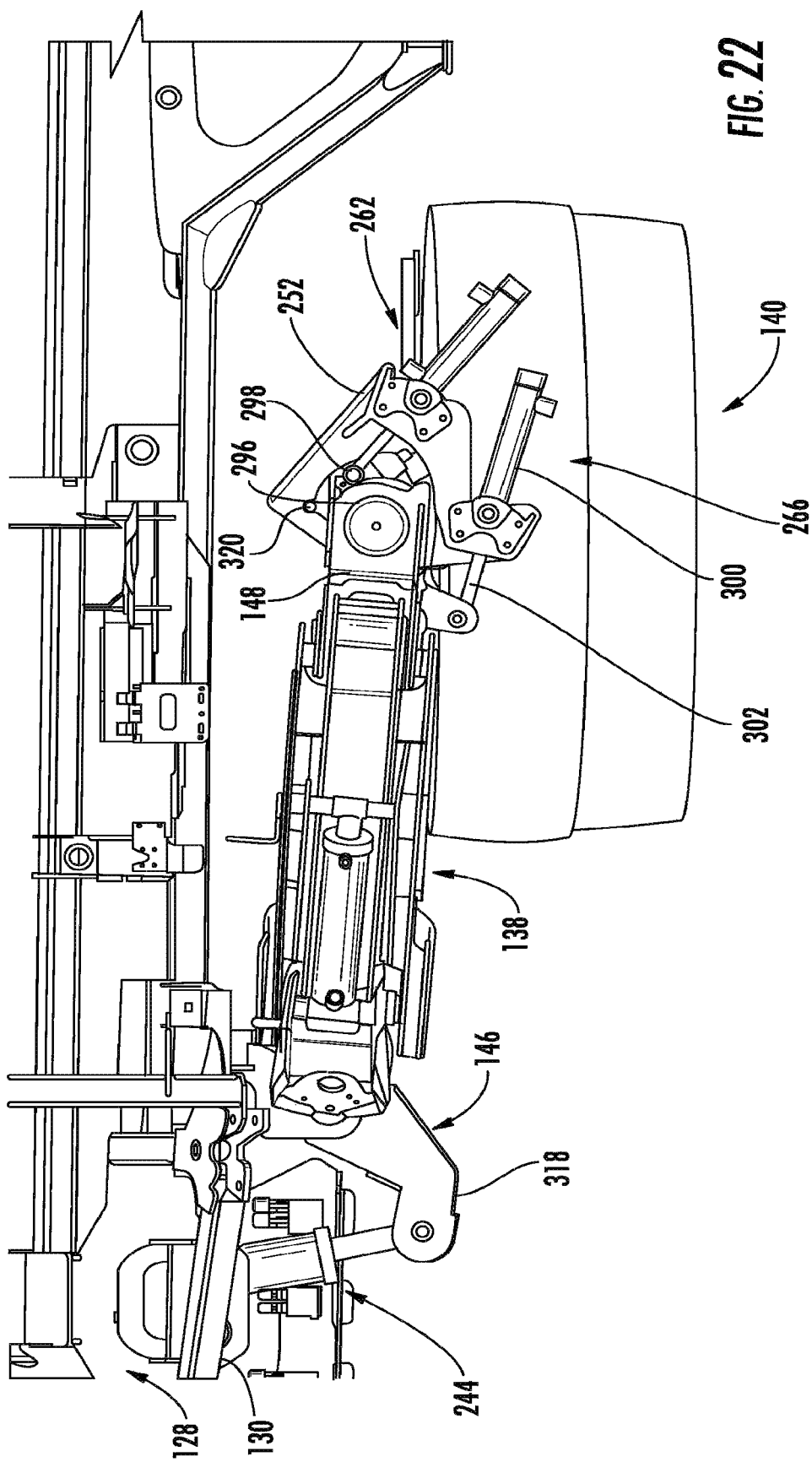
FIG. 22 illustrates a top perspective view of the toe assembly of FIG. 11 when the linkage assembly is angled toward the frame.

As shown in FIG. 22, when it is desired to provide the vehicle 128 with the minimum tread width 250, user 20 uses the control panel 226 to extend the hydraulic cylinder 244 moving the cantilevered arm 318 of the frame bracket 146 away from the frame 130 of the vehicle 128 thereby drawing the wheel 140 closer to the frame 130. Once the user 20 has performed this operation for all four linkage assemblies 138 the vehicle 128 will have a smaller tread width 250. FIGS. 19 & 22. While it would be possible to steer the wheels 140 with a single cylinder, such a single cylinder would provide a different turn radius for the vehicle 128 when the wheels 140 are retracted toward the frame 130 and when the wheels 140 are provided at their maximum tread width. To address this discrepancy, the vehicle 128 is provided with the hydraulic cylinder 266 to adjust for toe compensation when the wheels 140 are moved between tread widths. As shown in FIG. 22, when the wheel 140 is drawn toward the frame 130 reducing the tread width 250, the hydraulic cylinder 266 is actuated to retract the rod 302 into the barrel 300 of the hydraulic cylinder 266. This action causes the steering plate 252 to rotate relative to the leg bracket 148 repositioning the hydraulic cylinder 262 and the cutout 296 to allow the hydraulic cylinder 262 a full range of motion to provide the vehicle 128 to provide the vehicle 128 with the desired turning radius. As shown, the ends of the cutout 296 are provided with stops (320) to prevent the steel bar 298 from damaging the steering plate 252 in the event the hydraulic cylinder 262 tries to over rotate the steering plate 252.

Figure 23:
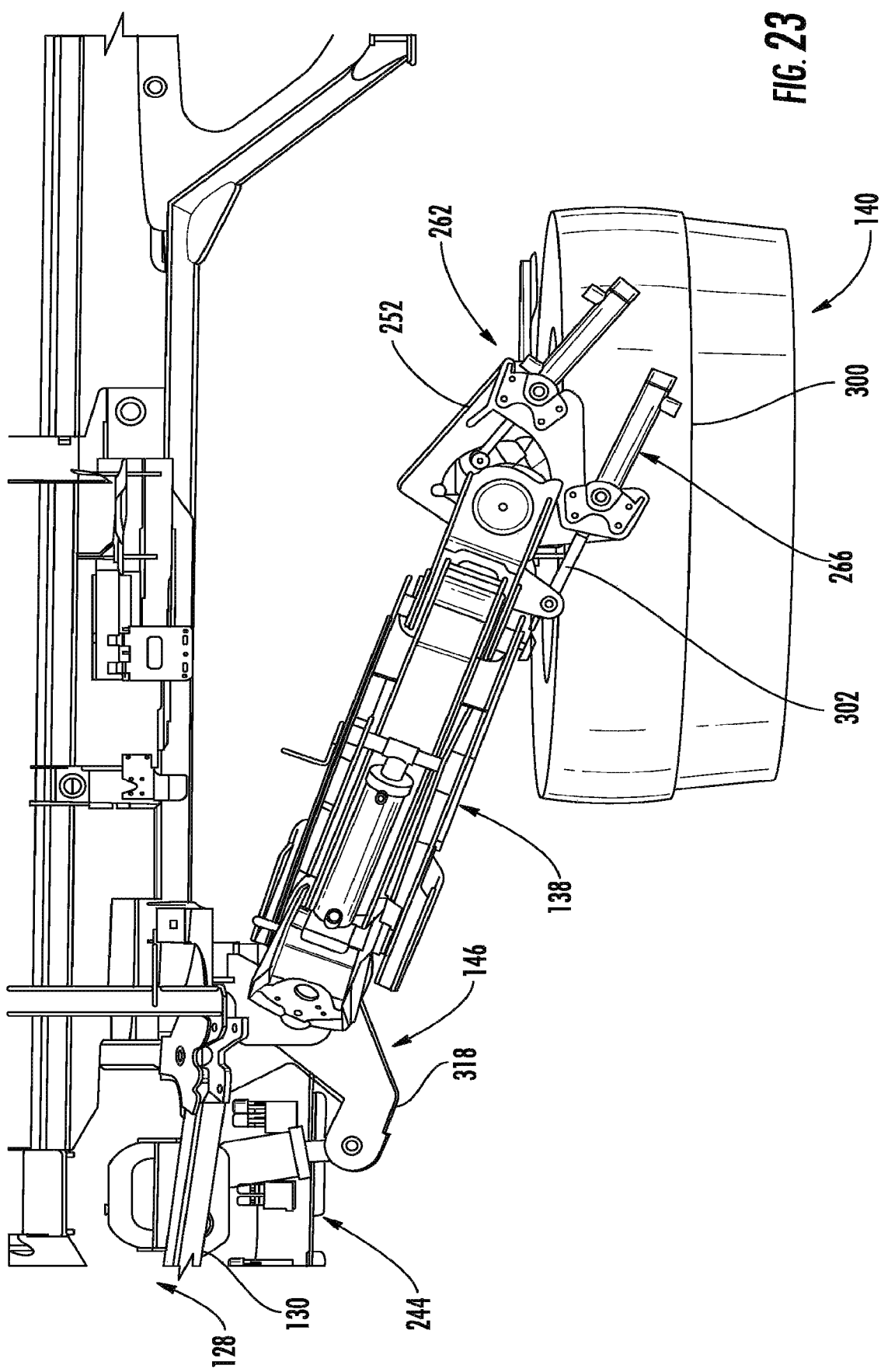
FIG. 23 illustrates a top perspective view of the toe adjustment assembly of FIG. 11 with the toe adjusted for when the linkage assembly is angled away from the frame.
Figure 24:
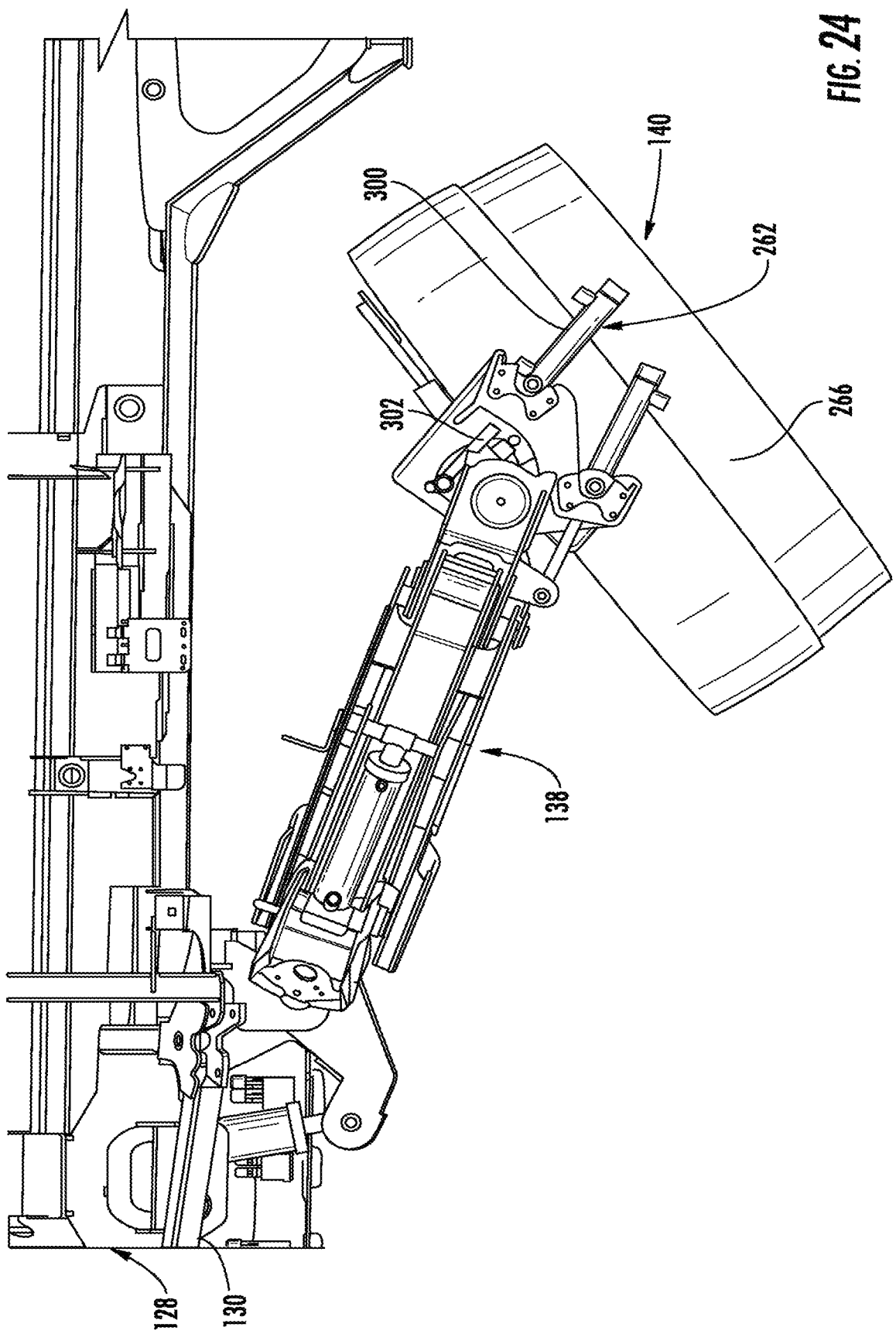
FIG. 24 illustrates a top perspective view of the toe adjustment assembly of FIG. 11 with the linkage assembly angled away from the frame and the steering turned toward the right.
Figure 25:
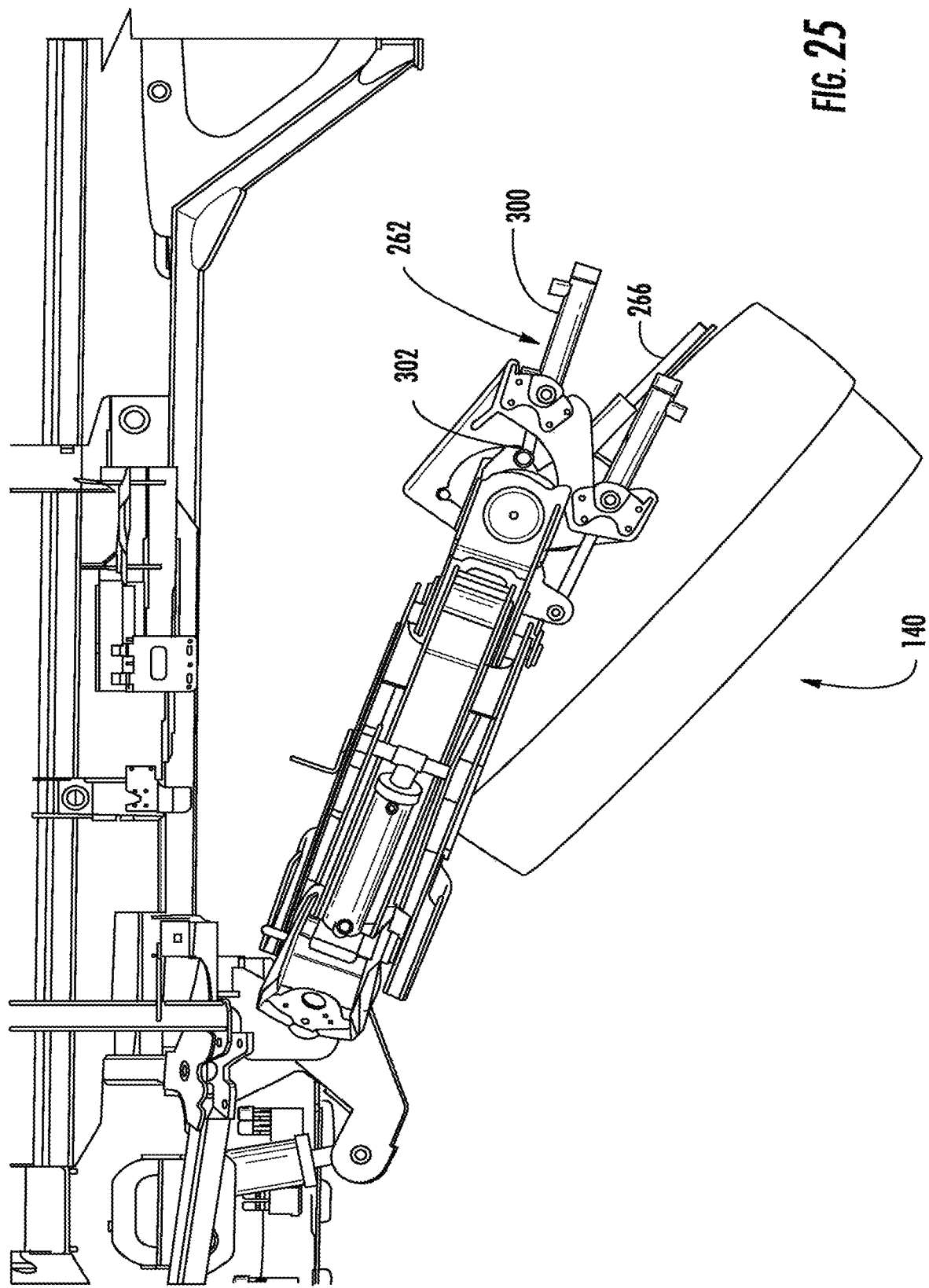
FIG. 25 illustrates a top perspective view of the toe adjust assembly of FIG. 11 with the linkage assembly angled away from the frame and the steering turned toward the left.
Figure 26:
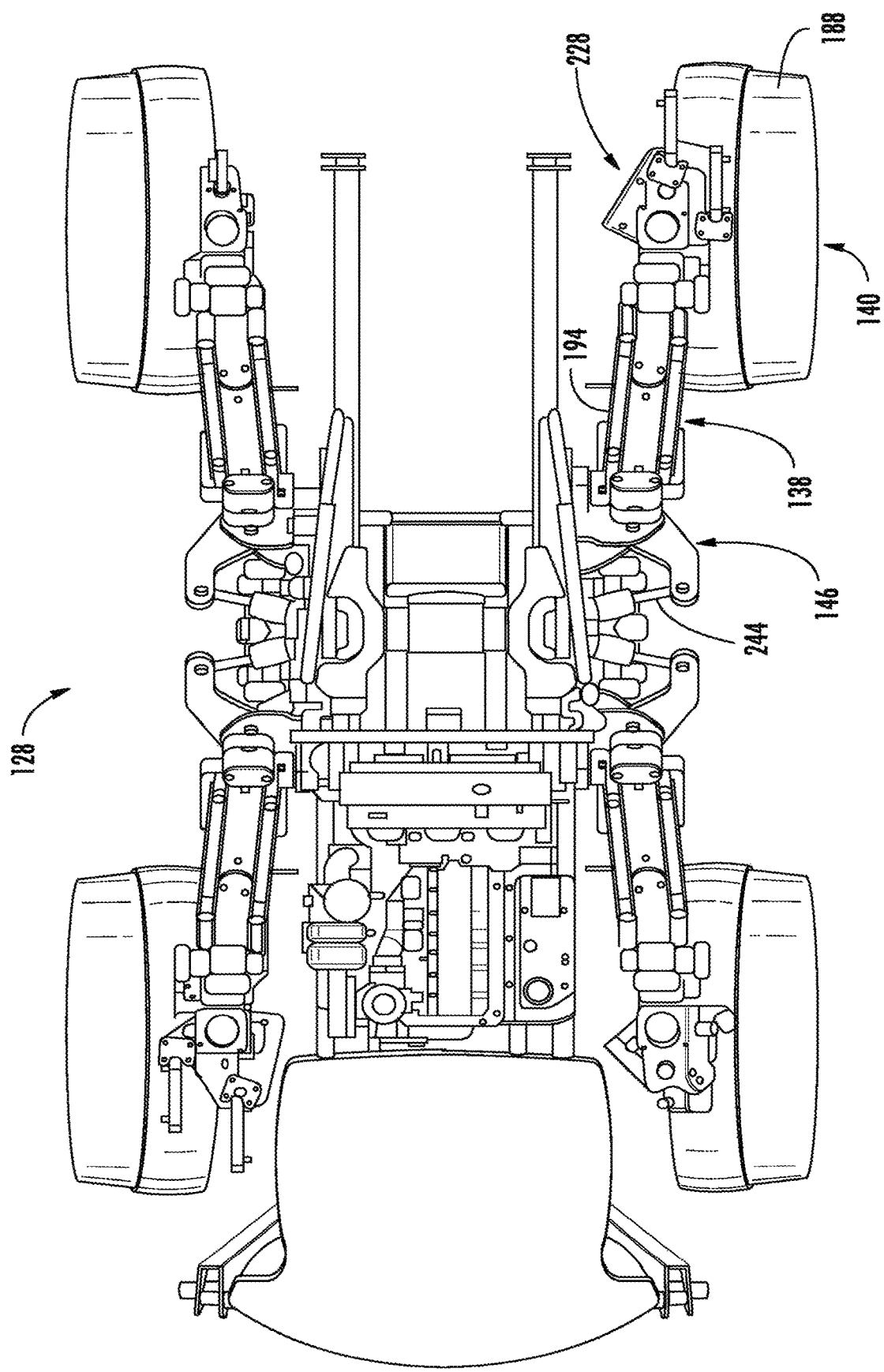
FIG. 26 illustrates a top elevation of the vehicle of FIG. 11 with the arms retracted.
Figure 27:
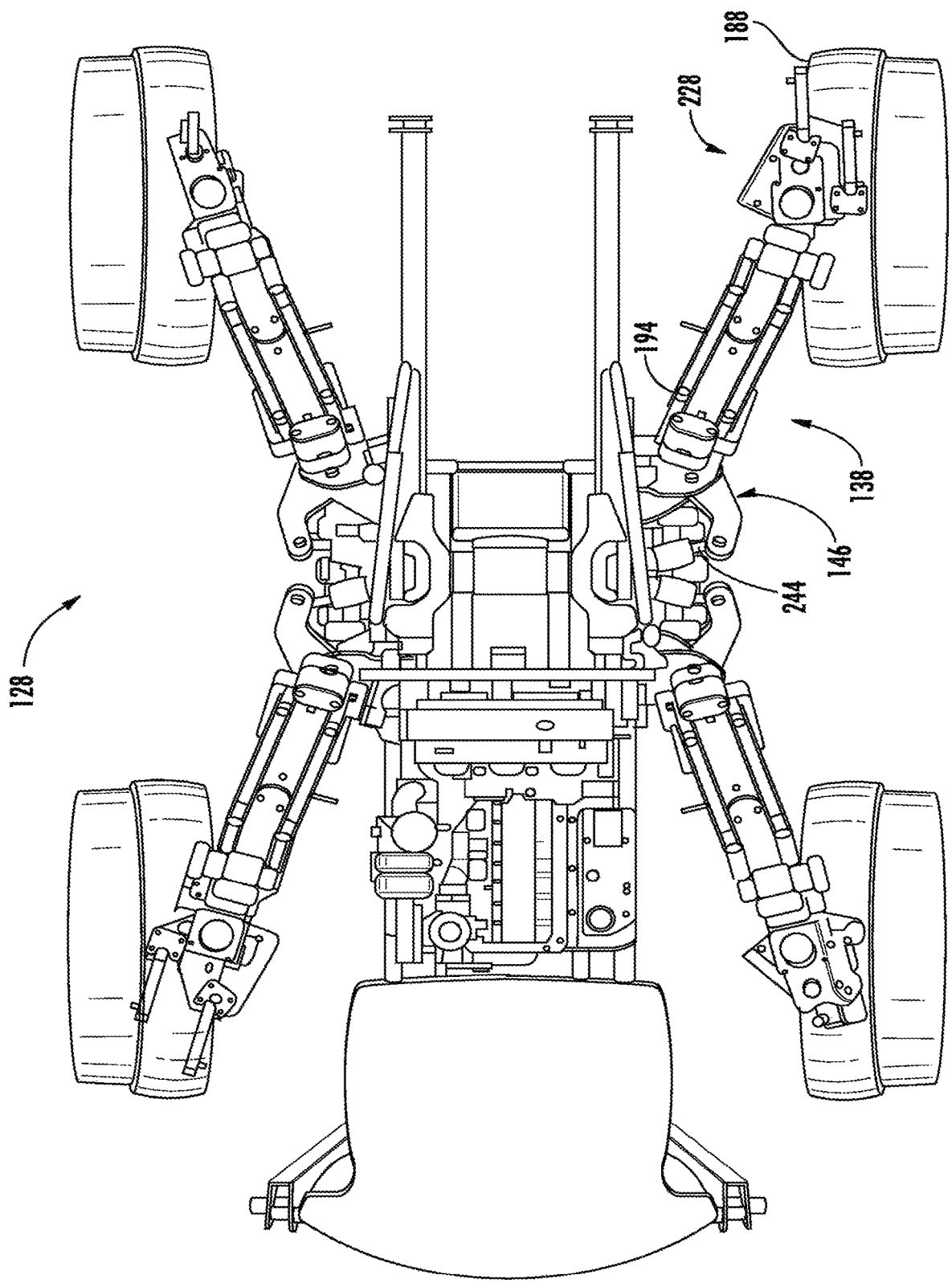
FIG. 27 illustrates a top elevation of the vehicle of FIG. 11 shown with the arms extended.

While the movement of the cylinder 244 and cylinder 266 may be actuated individually by the user 20, in the preferred embodiment, the control panel 226 is provided with a central processing unit 322 that automatically actuates the cylinder 266 in response to movement of the cylinder 244 to properly readjust the toe as the tread width changes. While the vehicle 128 may be provided with any desired range of tread width adjustability, in the preferred embodiment the vehicle 128 is capable adjusting the angle of the four bar linkage 138 relative the frame 130 preferably between 0° and 90°, more preferably between 0° and 45° and most preferably between about 5° as shown in FIGS. 22 and 20° as shown in FIG. 23. As shown in FIG. 23, when it is desired to increase the tread width 250 of the vehicle 128 the user 20 actuates the control panel 226 to retract the cylinder 244 pivoting the cantilevered arm 318 of the frame bracket 146 toward the frame 130 of the vehicle 128 and pivoting the four bar linkage 138 away from the frame 130 of the vehicle 128. FIGS. 11, 19 and 23. As the hydraulic cylinder 244 retracts, the central processing unit 322 automatically causes the hydraulic cylinder 266 to extend the rod 302 relative to the barrel 300 thereby rotating the steering plate 252 to allow the hydraulic cylinder 266 to maintain its full range of motion. Once the tread width 250 has been extended using the cylinder 244, and the toe automatically adjusted by the hydraulic cylinder 266, the user 20 can use a steering controller such as a steering wheel 324 to steer the wheels 140 across the full desired range of motion. This range of motion is shown in FIGS. 24 & 25. As shown in FIG. 24, when the user 20 turns the steering wheel 324 all the way to the right, this causes the hydraulic cylinder 262 to retract the rod 302 into the barrel 300 thereby turning the wheel 140 the maximum desired amount to the right. Conversely, as shown in FIG. 25, when it is desired to turn the wheel 140 to the left, the user 20 turns the steering wheel 324 to the left which causes the hydraulic cylinder 262 to extend the rod 302 from the barrel 300 thereby turning the wheel 140 the maximum desired amount to the left. Without the provision of the hydraulic cylinder 266, when the four bar linkage 138 was rotated away from the frame 130 of the vehicle 128, the toe of the wheel 140 would be too far to the right thereby dramatically and undesirably limiting the ability of the hydraulic cylinder 262 to steer the wheel 140 to the left. Exacerbating the problem is that the wheel 140 on the opposite side of the vehicle 128 without the hydraulic cylinder 266 to compensate for the toe of the wheel 140, the toe of the wheel 140 would be too far to the left so that the wheels 140 would no longer be parallel. While the cylinder 262 could conceivably be independently operated to align the wheels 140 parallel to one another because the right wheel would have a limited range of motion turning to the left and the left wheel 140 would have a limited range of motion turning to the right, the overall turning radius of the vehicle 128 would be dramatically and undesirably limited. By providing the cylinder 266 to automatically adjust the toe of the wheels 140, there is no need to independently operate the hydraulic cylinders 262 controlling the steering. The hydraulic cylinders 266 maintain the wheels 140 parallel to one another regardless as to whether the tread width of the vehicle 128 is at its maximum or minimum.

FIGS. 28-37 illustrate an agricultural variable height vehicle 400 according to another embodiment. The agricultural variable height vehicle 400 is similar to the variable height vehicle 128. The vehicle 400 includes a frame 405 defining a vehicle longitudinal axis 410 and that supports an engine 415, a power unit 420 operably coupled to the engine 415 to produce hydraulic power and/or electrical power (operable as a pump), and an operator cab 425. A sprayer boom assembly 430 is removably coupled to a front portion 435 of the frame 405 in front of the operator cab 425.

Figure 28:
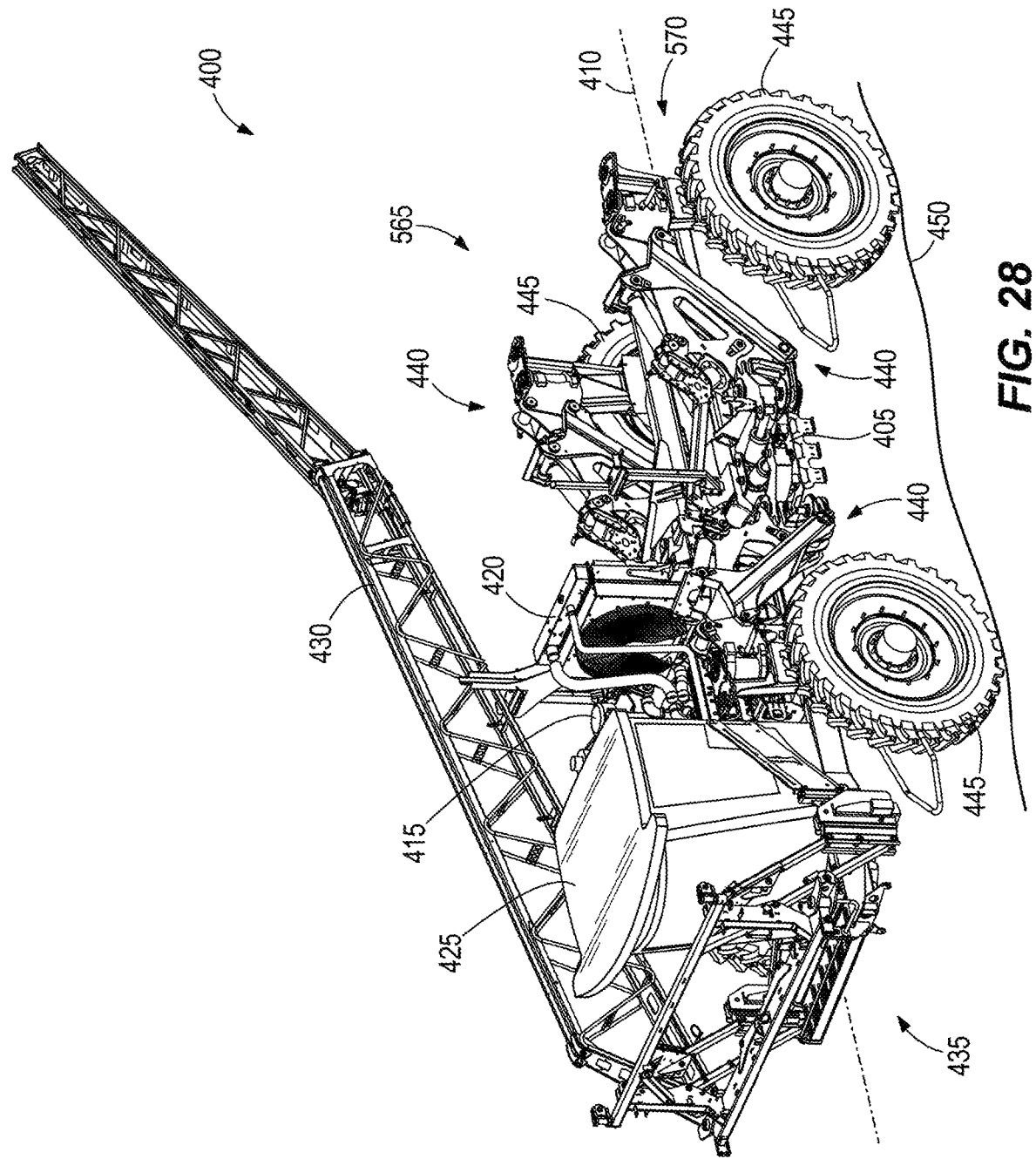
FIG. 28 is a perspective view of an agricultural vehicle according to another embodiment of the disclosure including ride height adjustable suspension assemblies.
Figure 29A:
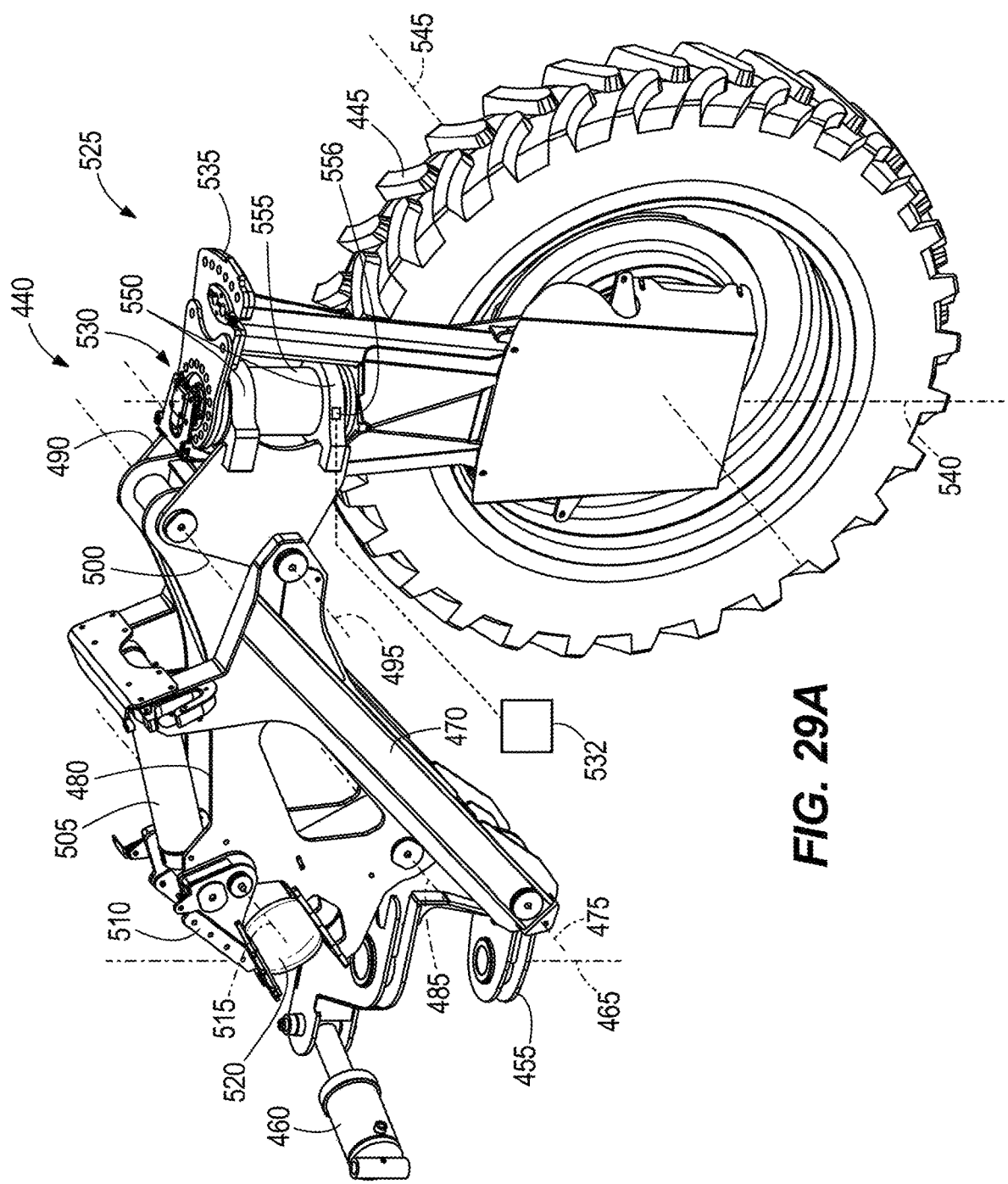
FIG. 29A is a top perspective view of one of the suspension assemblies of FIG. 28.
Figure 29B:
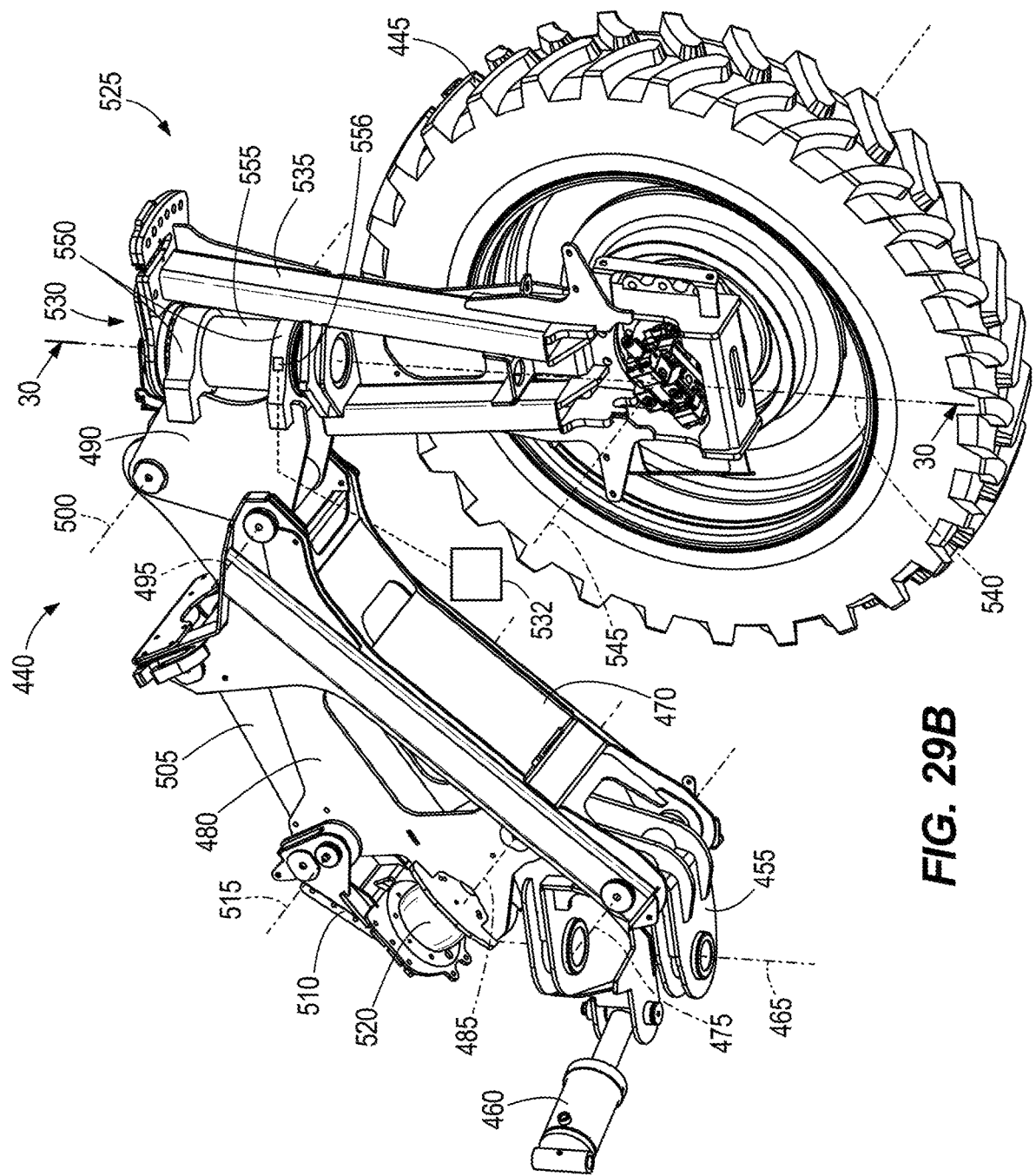
FIG. 29B is a bottom perspective view of the suspension assembly of FIG. 29A.
Figure 30:
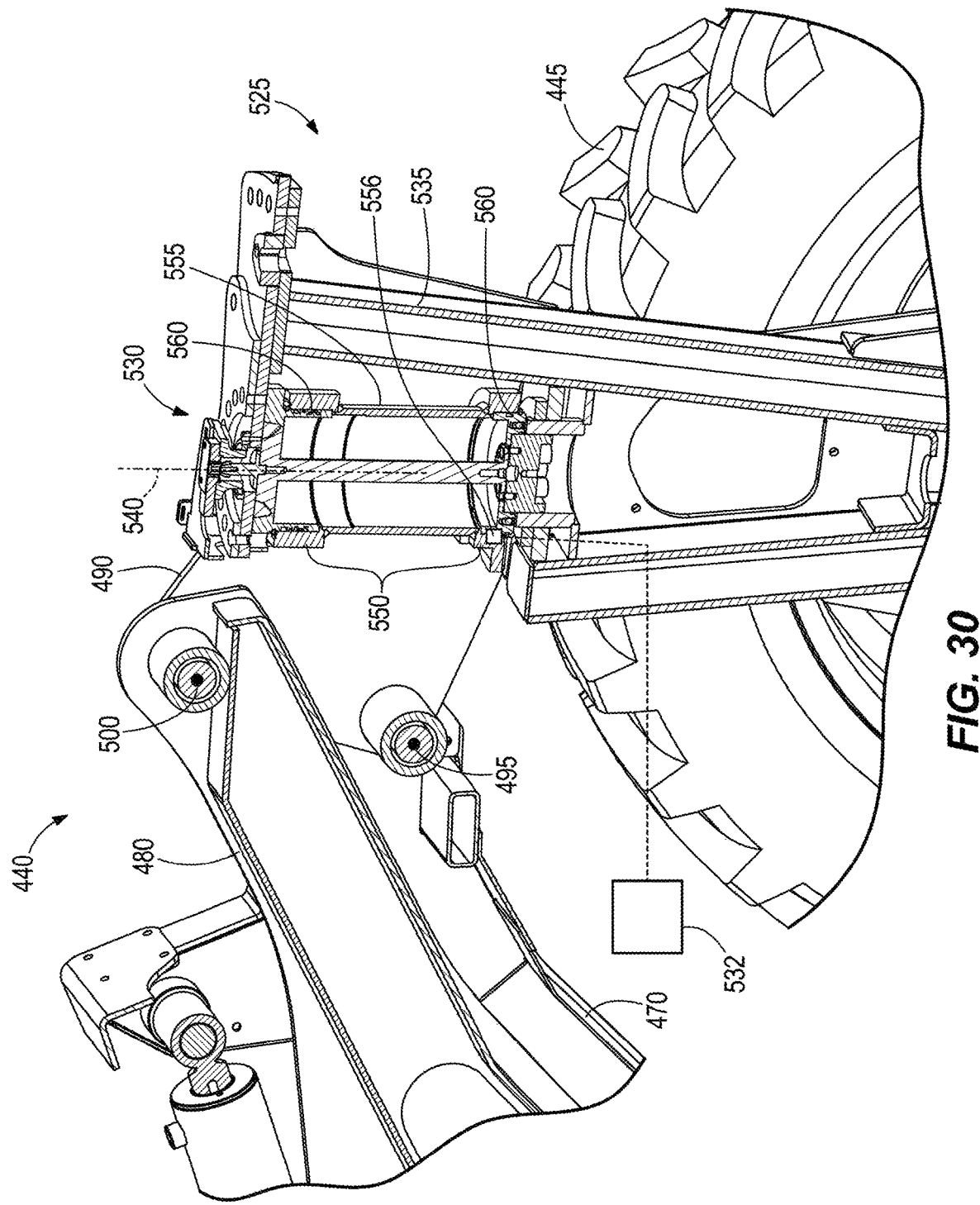
FIG. 30 is a cross sectional view of the suspension assembly of FIG. 29B taken along line 30-30.

With reference to FIGS. 28-30, the vehicle 400 also includes four linkage/suspension assemblies 440 coupled to the frame 405 (three of which are visible in FIG. 28), with each suspension assembly 440 including a wheel 445 that supports the frame 405 above an agricultural field/surface 450. In another embodiment, each wheel 445 may be a continuous track. The illustrated suspension assemblies 440 are similar to the four bar linkage assemblies 138 described in a previous embodiment (FIGS. 11-27). Each suspension assembly 440 includes a frame bracket 455 and a first hydraulic actuator 460. The first hydraulic actuator 460 is coupled between the frame bracket 455 and the frame 405 and is operable to pivot the suspension assembly 440 relative to the frame 405 about a first axis 465. Each suspension assembly 440 also includes a first arm 470 pivotably coupled to the frame bracket 455 about a first pivot axis 475 and a second arm 480 pivotably coupled to the frame bracket 455 about a second pivot axis 485. In addition, the first arm 470 is pivotably coupled to a leg bracket 490 about a third pivot axis 495, and the second arm 480 is pivotably coupled to the leg bracket 490 about a fourth pivot axis 500. A second hydraulic actuator 505, which is similar to the actuator 194 and may be in the form of a linear hydraulic cylinder, is coupled at on end to a bridge portion of the first arm 470 that spans the second arm 480 and at the other end to a plate member 510 pivotably coupled to the second arm 480 about a fifth pivot axis 515. Furthermore, an airbag 520 is coupled between the plate member 510 and the second arm 480.

As shown in FIGS. 29A, 29B, and 30, each suspension assembly 440 includes a turning sub-assembly 525. The turning assembly 525 replaces both hydraulic cylinders 262, 266 of the turning assembly 220 with a single rotary actuator 530. As such, the rotary actuator 530 functions to provide rotary motion as do the hydraulic cylinders 262, 266. The rotary actuator 530 is in communication with a central processing unit 532 similar to the central processing unit 322. Each rotary actuator 530 is coupled between the leg bracket 490 and a leg 535 and is configured to rotate one wheel 445 about a steering axis 540 with the steering axis 540 substantially perpendicular to a rotational axis 545 of the wheel 445. In the illustrated embodiment, the rotary actuator 530 is concentric with the steering axis 540. In other embodiments, the rotary actuator 530 may be oriented perpendicular to the steering axis 540 (e.g., through a bevel gear assembly) or may be obliquely oriented relative to the steering axis 540. Referring to FIG. 30, bearings 560 are positioned between inner and outer members 550, 555 of the rotary actuator 530 so that the inner member 555 rotates relative to the outer member 550 about the steering axis 540. In the illustrated embodiment, hydraulic power from the power unit 420 is operable to move the inner member 555 relative to the outer member 550. In other embodiments, pneumatic or electrical power may be used to move the inner member 555 relative to the outer member 550. In other embodiments, the vehicle 400 may only include two turning assemblies 525 located on the two front suspension assemblies 440 so that the vehicle 400 may only include two rotary actuators 530 to steer the vehicle 400.

In one embodiment, a position sensor 556 is built into each rotary actuator 530 and is configured to measure an orientation of each wheel 445 relative to the frame 405 or a portion of the suspension assembly 440 about the steering axis 540. Each position sensor 556 is also configured to signal the central processing unit 532 for the central processing unit 532 to adjust the toe of each wheel 445, as described above (e.g., when the suspension assemblies 440 pivot about a corresponding first axis 465). In particular, each position sensor 556 measures a relative orientation of the outer and inner members 550, 555 of each rotary actuator 530 about the steering axis 540 to determine a steering direction of each wheel 445. Moreover, the position sensors 556 coupled to each corresponding rotary actuator 530 of the front two wheels 445 are in communication with each other so that the central processing unit 532 controls the front two wheels 445 to be always parallel to each other. The position sensors 556 coupled to each corresponding rotary actuator 530 of the rear two wheels 445 are also in communication with each other so that the central processing unit 532 controls the rear two wheels 445 to be always parallel to each other.

Figure 31A:
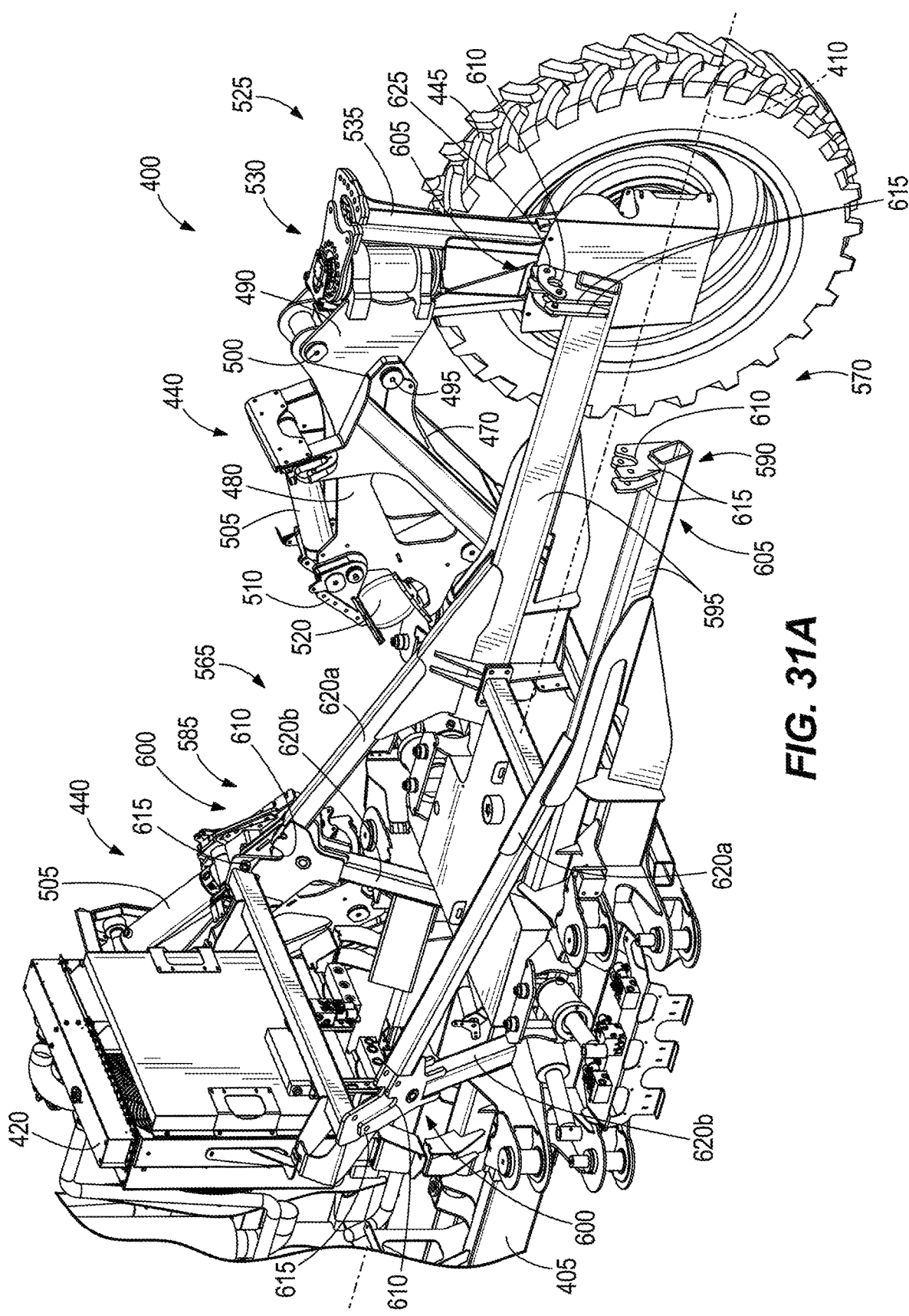
FIG. 31A is a perspective view of a portion of the agricultural vehicle of FIG. 28, in particular a support area.

With reference to FIG. 31A, the illustrated frame 405 also defines a support area 565 at a rear portion 570 of the vehicle 400 configured to detachably support and couple a first detachable applicator/dry applicator 575 (FIG. 32) or a second detachable applicator/wet applicator/liquid applicator 580 (FIG. 33), as discussed in more detail below. The support area 565 includes a forward end 585, a rearward end 590, and two tubular frame members 595 between the forward and rearward ends 585, 590. The forward end 585 is defined by two forward connection areas 600, and the rearward end 590 is defined by two rearward connection areas 605. In the illustrated embodiment, each connection area 600, 605 defines a slot or groove 610 formed by one or more plate members 615. Specifically, the plate members 615 of the rearward connection area 605 are directly coupled to the tubular frame members 595, and the plate members 615 of the forward connection areas 600 are coupled to both the frame 405 and the tubular frame members 595 by support members 620a, 620b. The connection areas 600, 605 are oriented so that the two forward connection areas 600 are located above the two rearward connection areas 605 in a direction perpendicular to the surface 450.

Figure 31B:
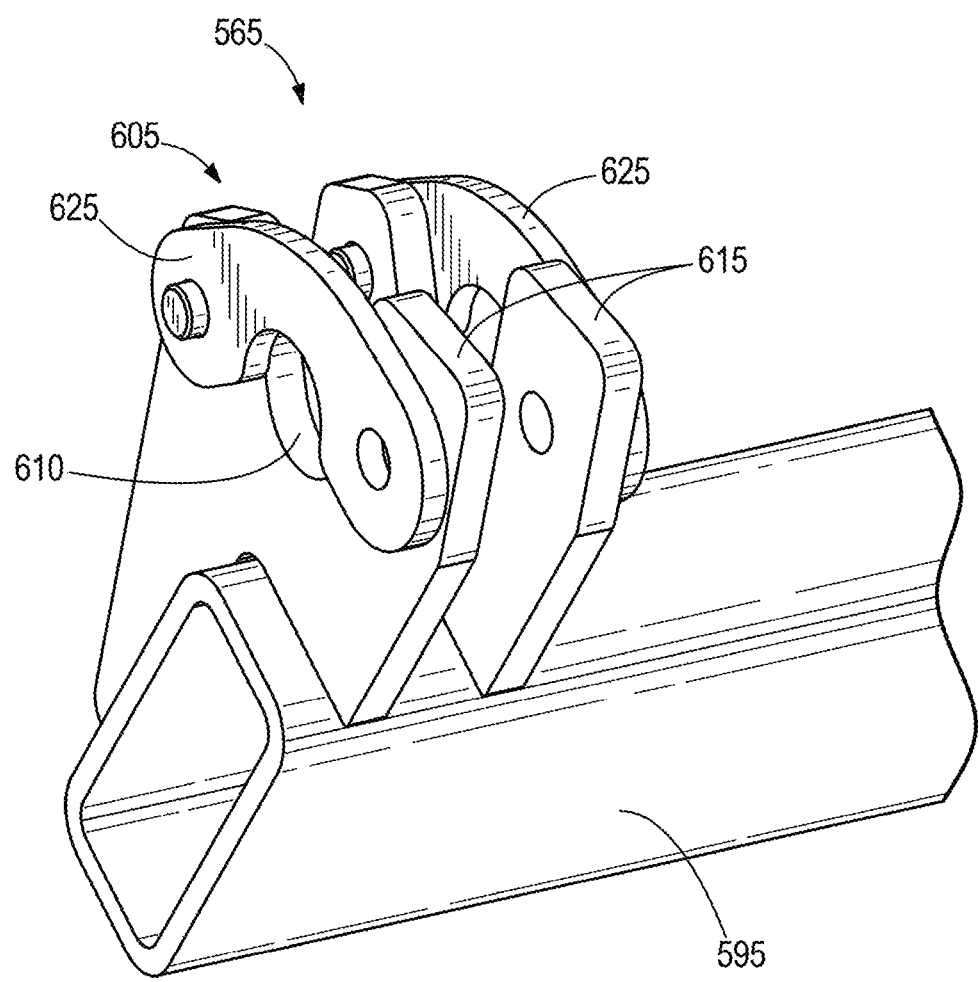
FIG. 31B is a perspective view of a portion of the support area of FIG. 31A, in particular a locking assembly.
Figure 34:
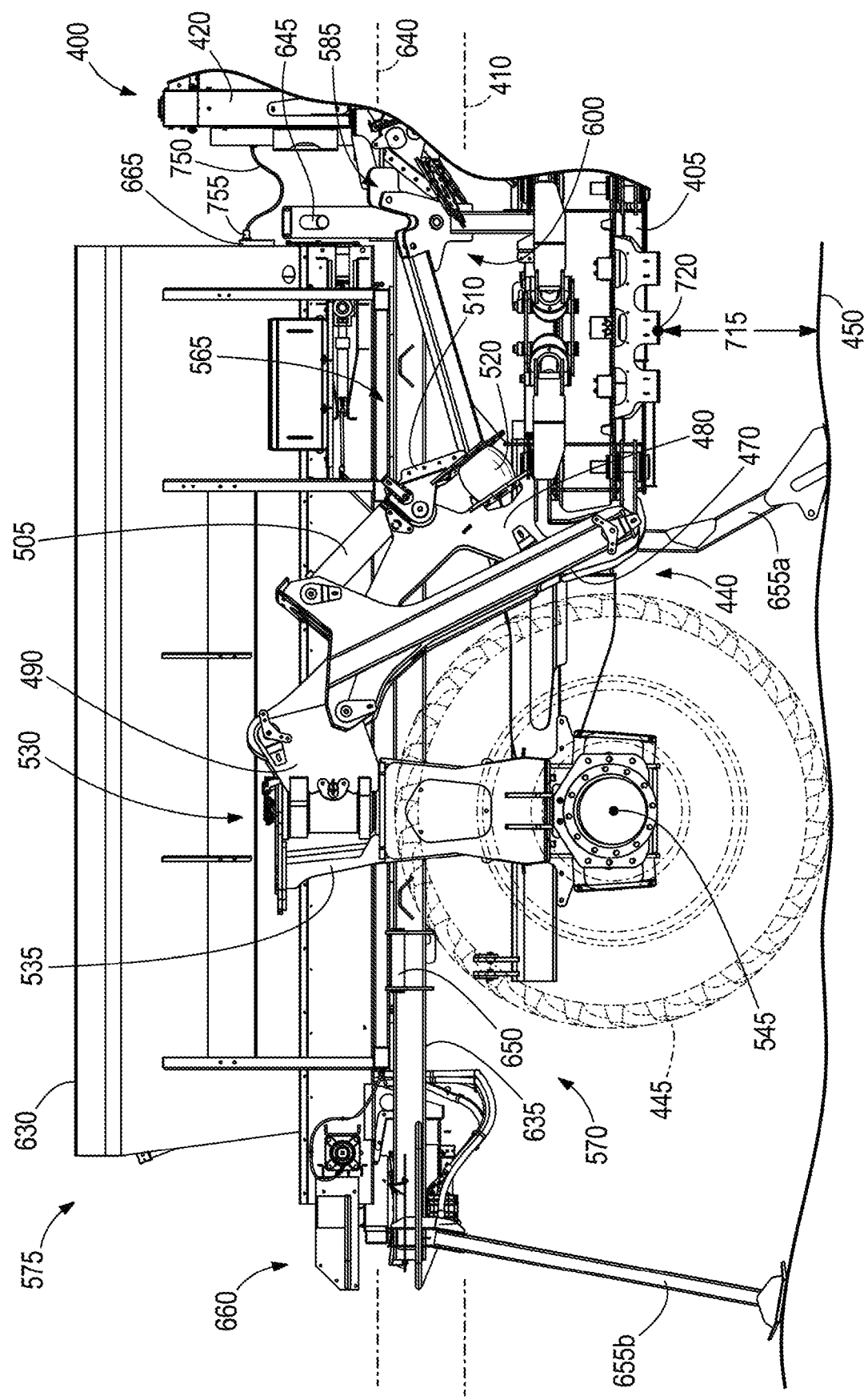
FIG. 34 is a side view of a portion of the agricultural vehicle of FIG. 28 and the dry applicator of FIG. 32 with the agricultural vehicle in a lowered position decoupled from the dry applicator.
Figure 35:
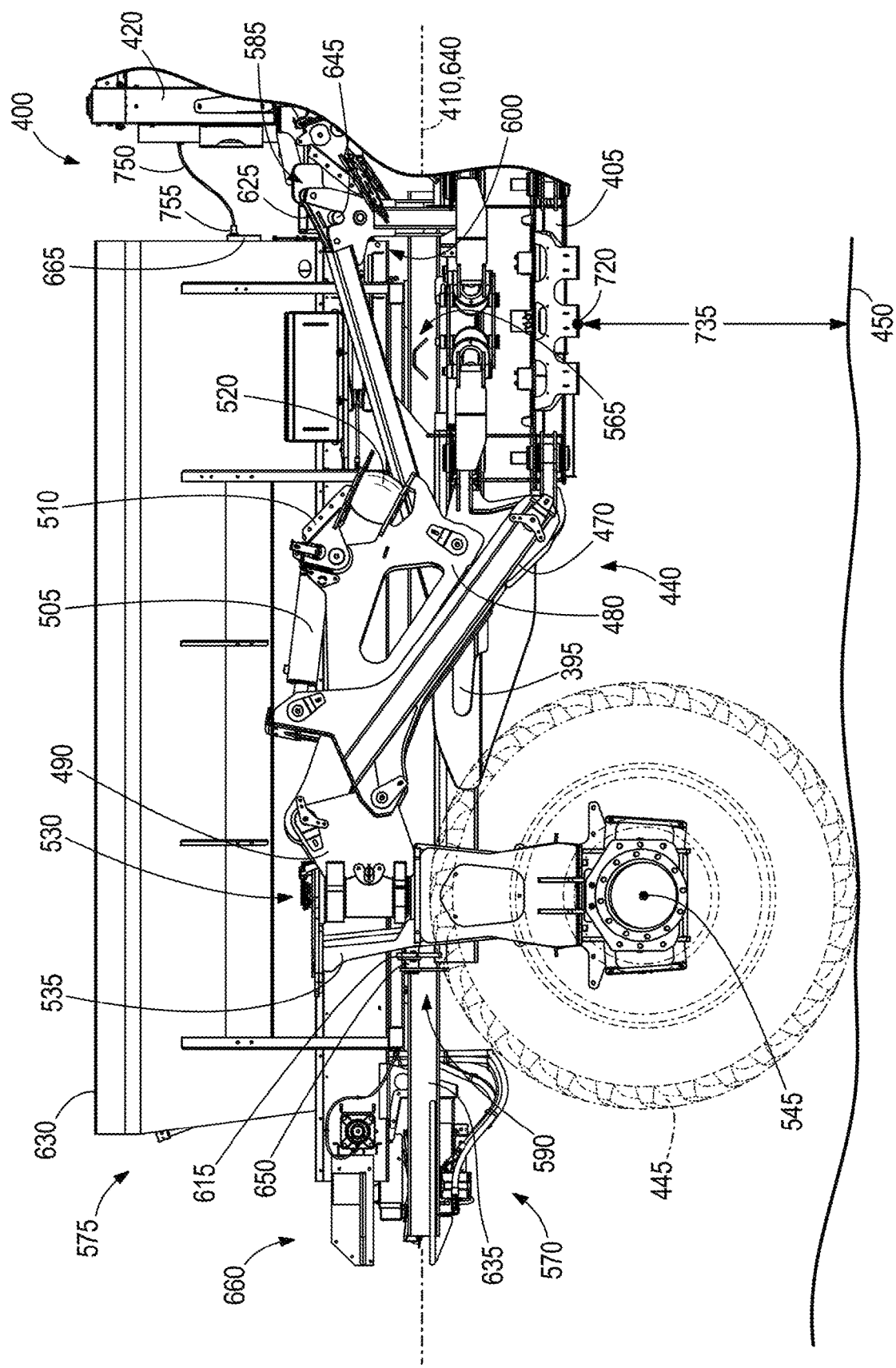
FIG. 35 is a side view of a portion of the agricultural vehicle of FIG. 28 and the dry applicator of FIG. 32 with the agricultural vehicle in a coupling position coupled to the dry applicator.
Figure 36:
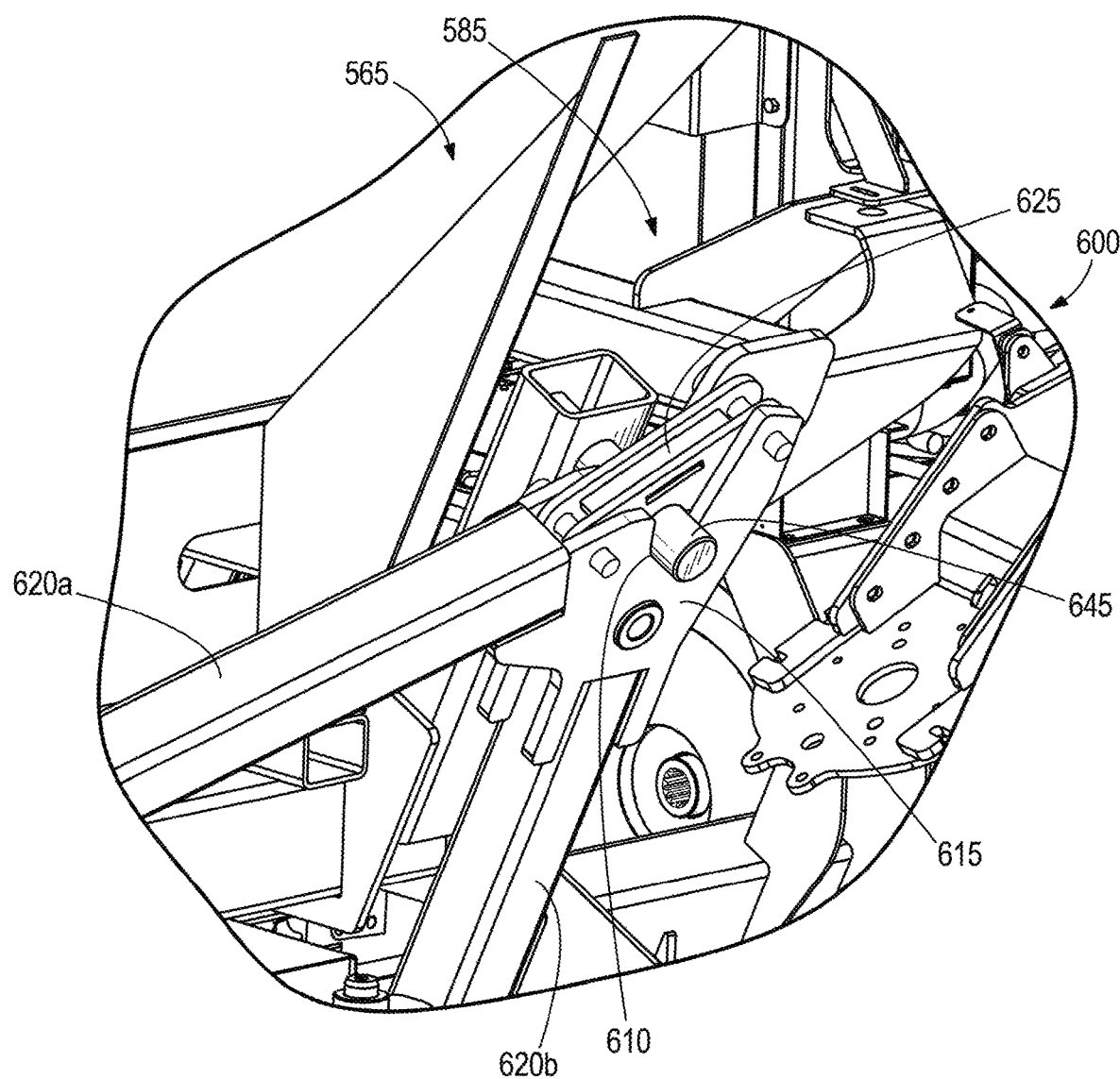
FIG. 36 is a perspective view of the locking assembly of FIG. 31B in a locked position securing the dry applicator to the agricultural vehicle.
Figure 37:
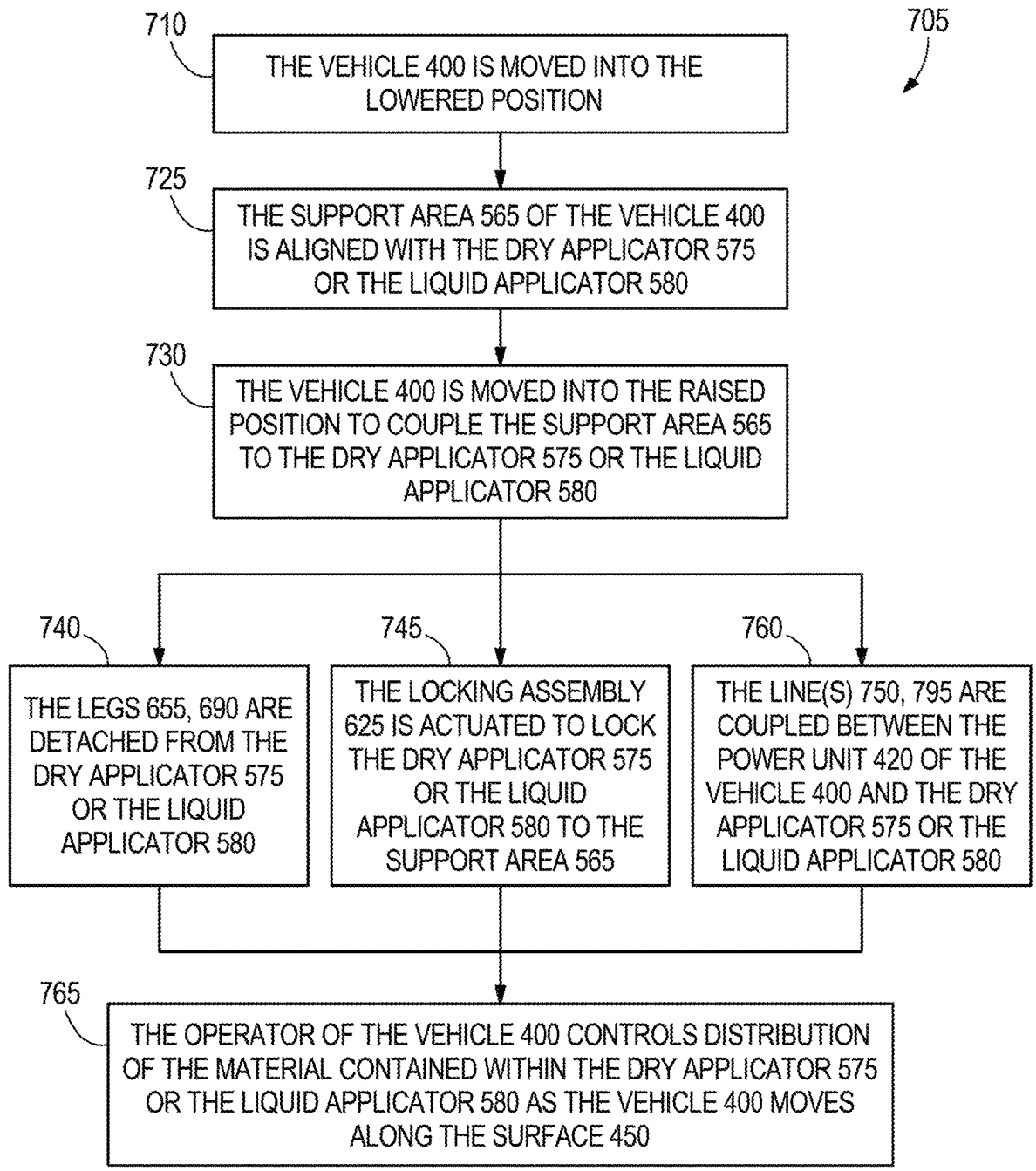
FIG. 37 illustrates a method of coupling the dry applicator to the agricultural vehicle of FIG. 28.

With further reference to FIG. 31B, a locking assembly 625 (e.g., a latch) is positioned at one or more connection areas 600, 605 and is moveable between an unlocked position (FIGS. 34 and 36) and a locked position (FIGS. 35 and 37). In particular, the locking assembly 625 is pivotably coupled to the plate members 615 at one end of the locking assembly 625. In the locked position, a pin is received through the other end of the locking assembly 625 to fix the locking assembly 625 to the plate members 615. The illustrated locking assembly 625 may be in communication with the power unit 420 to be automatically actuated between the locked position and the unlocked position, or the locking assembly 625 may be manually actuated between the locked position and the unlocked position. In other embodiments, the locking assembly 625 may translate between the unlocked position and the locked position. In further embodiments, the locking assembly 625 may be omitted.

Figure 32:
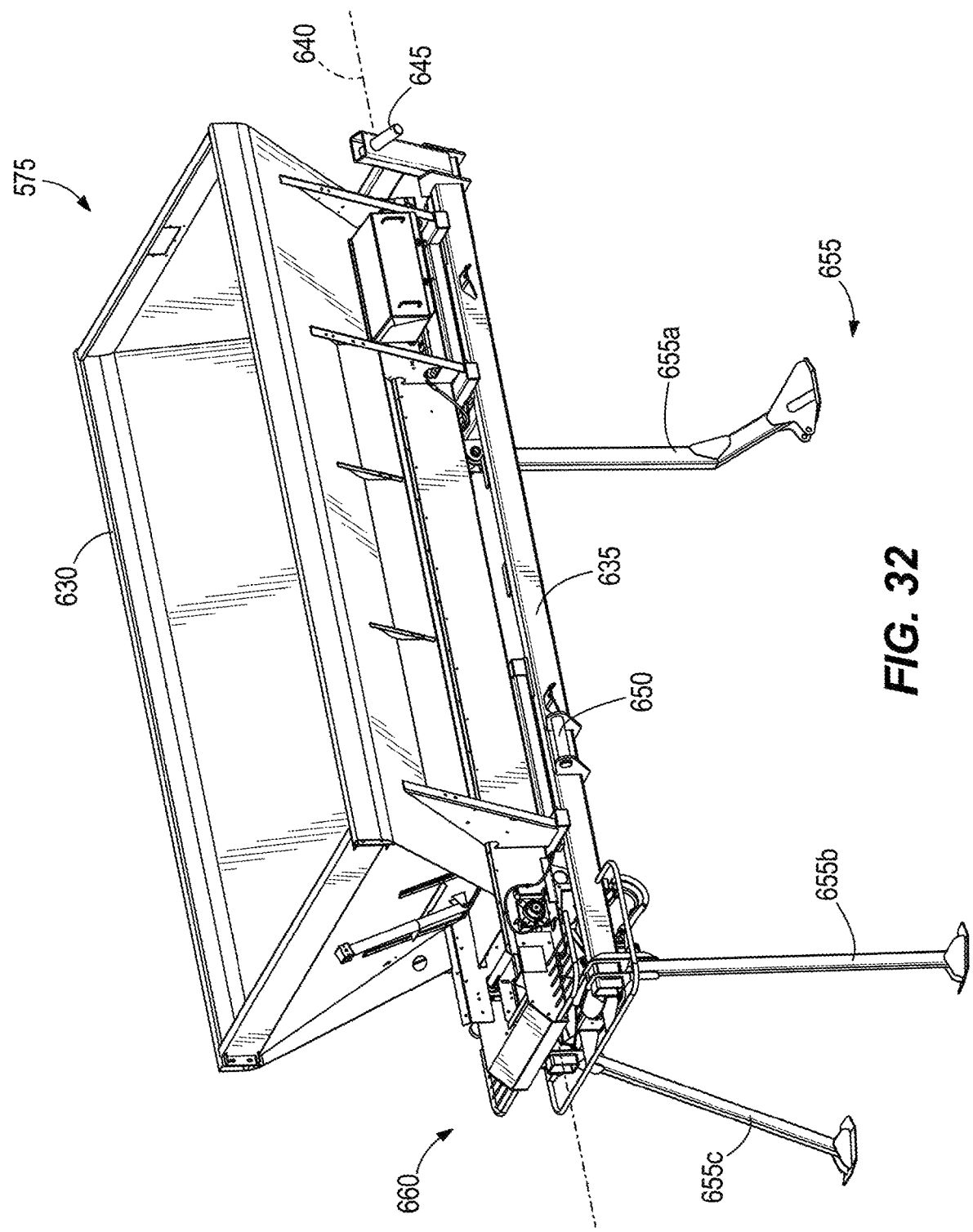
FIG. 32 is a perspective view of a dry applicator configured to be selectively supported by the support area of FIG. 31A.

The dry applicator 575, as illustrated in FIG. 32, is configured to contain solid material (e.g., solid fertilizer, solid pesticides, etc.) within a dry container 630 and includes a dry applicator frame 635 that defines an applicator longitudinal axis 640 and is sized to be received within the support area 565. In the illustrated embodiment, the dry container 630 is sized to contain at least 300 cubic feet of solid material. The illustrated dry applicator frame 635 includes forward connection brackets/pins 645 and rearward connection brackets/pins 650. In the illustrated embodiment, the forward connection pins 645 extend from the dry applicator frame 635 in a direction perpendicular to the applicator longitudinal axis 640, and the rearward connection pins 650 extend from the dry applicator frame 635 in a direction parallel to the applicator longitudinal axis 640.

The dry applicator frame 635 is also configured to be self-supporting above the surface 450 by legs 655. In the illustrated embodiment, three legs 655a, 655b, 655c function as a tri-pod to support the dry applicator frame 635 at least 38.5 inches above the surface 450; however, in other embodiments, more than three legs 655 may be used. The illustrated legs 655 are detachable from the dry applicator frame 635. In other embodiments, the legs 655 are pivotably and/or telescopically coupled to the dry applicator frame 635 between a support position (FIG. 32) and an in-use position (e.g., when the dry applicator 575 is coupled to the vehicle 400). In further embodiments, the legs 655 may be omitted and a stand/base or other form of freestanding support may be used to support the dry applicator 575 above the surface 450.

In addition, a distributor 660 is in communication with an interior of the dry container 630 and is configured to distribute the solid material contained within the dry container 630 onto the surface 450. The dry applicator 575 also includes an input unit 665 (FIG. 34) configured to receive hydraulic power and/or electrical power from the power unit 420. The input unit 665 then supplies the hydraulic power and/or the electrical power to the distributor 660 or other components of the dry applicator 575.

Figure 33:
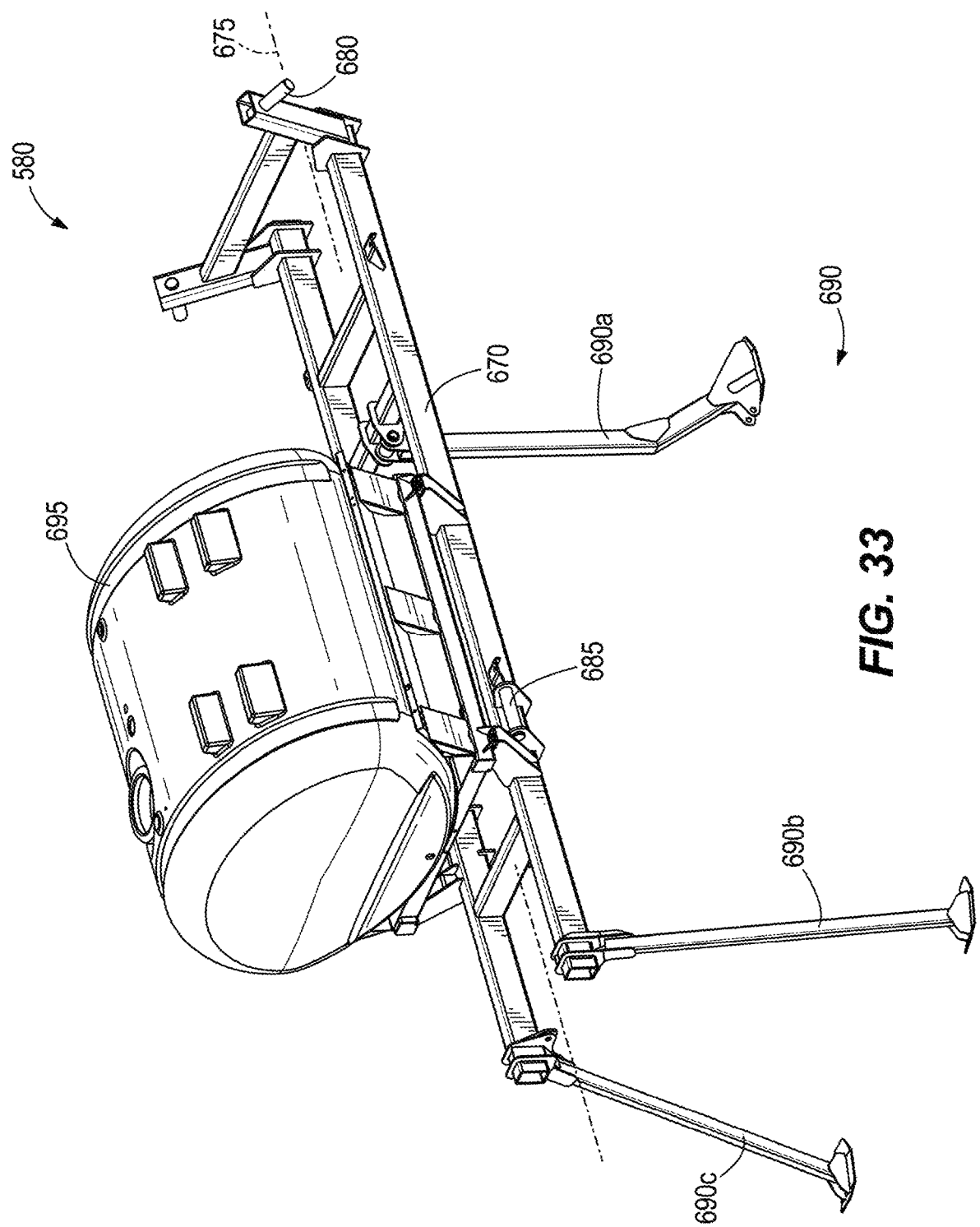
FIG. 33 is a perspective view of a liquid applicator configured to be selectively supported by the support area of FIG. 31A.

With reference to FIG. 33, the liquid applicator 580 includes a liquid applicator frame 670 similar to the dry applicator frame 635. The liquid applicator frame 670 defines an applicator longitudinal axis 675 and is sized to be received within the support area 565. The illustrated liquid applicator frame 670 includes forward connection brackets/pins 680 and rearward connection brackets/pins 685. In the illustrated embodiment, the forward connection pins 680 extend from the liquid applicator frame 670 in a direction perpendicular to the applicator longitudinal axis 675, and the rearward connection pins 685 extend from the liquid applicator frame 670 in a direction parallel to the applicator longitudinal axis 675.

The liquid applicator frame 670 is also configured to be self-supporting above the surface 450 by legs 690. In the illustrated embodiment, three legs 690a, 690b, 690c function as a tri-pod to support the liquid applicator frame 670 at least 38.5 inches above the surface 450; however, in other embodiments, more than three legs 690 may be used. The illustrated legs 690 are detachable from the liquid applicator frame 670. In other embodiments, the legs 690 are pivotably and/or telescopically coupled to the liquid applicator frame 670 between a support position (FIG. 33) and an in-use position (e.g., when the liquid applicator 580 is coupled to the vehicle 400). As with the dry applicator, in further embodiments, the legs 690 may be omitted and a stand/base or other form of freestanding support may be used to support the liquid applicator 580 above the surface 450.

In addition, one or more liquid containers 695 are coupled to the liquid applicator frame 670 and are configured to contain liquid material (e.g., liquid fertilizer, liquid pesticides, etc.). The illustrated liquid container(s) 695 are sized such that the combination of the liquid container(s) 695 is configured to contain at least 1800 gallons of liquid material. Each liquid container 695 includes an output unit 700 configured to provide fluid communication between the liquid container 695 and the sprayer boom 430, as described in more detail below.

With reference to FIGS. 34-37, an operator of the vehicle 400 can selectively couple the dry applicator 575 to the vehicle 400 to distribute the solid material contained within the dry applicator 575 onto the surface 450 (e.g., a field surface) as illustrated by a coupling method 705. For example, to couple the dry applicator 575 to the vehicle 400 (FIG. 35), the vehicle 400 is moved via the suspension assemblies 440 into a lowered position above the surface 450 (step 710; FIG. 34). The lowered position of the vehicle 400 is defined by a first vertical distance 715 between the surface 450 and a point 720 on the frame 405 when the connections areas 600, 605 of the vehicle 400 are positioned lower than the connection pins 645, 650 of the dry applicator 575. The portion or point 720 of or on the frame 405 is defined by the closest portion of the frame 405 to the surface 450 and should generally therefore equate to the lowermost portion or point of the frame 405. In the illustrated embodiment, the first vertical distance 715 is greater than or equal to 1 meter (38.5 inches). In other embodiments, the first vertical distance 715 is less than 50 inches. The support area 565 of the vehicle 400 is thereafter or concurrently moved under the dry applicator 575 so that the connection areas 600, 605 align with the corresponding connection pins 645, 650 in a vertical direction (step 725; FIG. 34). In the illustrated embodiment, the operator of the vehicle is able to visually observe proper alignment of at least the connection areas 600 and the connection pins 645 by looking back at the dry applicator 575 within a cab (similar to the operator station 136) of the vehicle 400. In other embodiments, an alignment assembly (e.g., sensors, cameras) may be coupled to the frame 405 of the vehicle 400 to guide the operator into proper alignment between the dry applicator 575 and the vehicle 400 as the operator is within the cab of the vehicle 400.

After the dry applicator 575 is properly aligned with the vehicle 400, the vehicle 400 is moved via the suspension assemblies 440 into a coupling or attachment position above the surface 450 (step 730; FIG. 35). The coupling position of the vehicle 400 is defined by a second vertical distance 735 between the surface 450 and the portion or point 720 on the frame 405, which is larger than the first distance 715, when the connection areas 600, 605 of the vehicle 400 are engaged with the connection pins 645, 650 of the dry applicator 575 and the weight of the dry applicator frame 575 is transitioning from the two tubular frame members 595. In the illustrated embodiment, the second vertical distance 735 is less than 2.5 meters (101 inches). In other embodiments, the second vertical distance 735 is greater than 50 inches. In one embodiment, once the connection pins 645, 650 engage with the connection areas 600, 605, the frame 405 is raised again (e.g., higher than the second vertical distance 735) to provide enough clearance between the legs 655 and the surface 450 for the legs 655 to be detached from the dry applicator 575 (step 740; FIG. 35). The illustrated locking assembly 625 is actuated to lock the dry applicator 575 (FIG. 36) to the vehicle 400 as illustrated in step 745. In other embodiments, the locking assembly 625 is actuated prior to raising the frame 405 from the coupling position. As shown in FIG. 36, the locking assembly 625 is moved over at least one connection pin 645, 650 so that the at least one connection pin 645, 650 is positioned between the locking assembly 625 and the corresponding plate member 615.

With reference to FIG. 35, hydraulic/electrical line(s) 750 are coupled between the power unit 420 and the input unit 665 of the dry applicator 575 via quick-disconnects 755 as illustrated in step 760. In one embodiment, both ends of the hydraulic/electrical line(s) 750 can include the quick-disconnects 755 or only one end of the hydraulic/electrical line(s) 750 can include a quick-disconnect 755. Again, in other embodiments, the coupling of the hydraulic/electrical lines occurs prior to raising the frame 405 from the coupling position. In yet other embodiments, the steps 710, 725, 730, 740, 745, 760 may be arranged in a different order as long as step 710 is before step 730.

After the power unit 420 is in communication with the input unit 665 of the dry applicator 575, the operator of the vehicle 400 can control distribution of the solid material within the dry container 630 onto the surface 450 via the distributor 660 as the vehicle 400 moves along the surface 450 (step 765). Moreover, as the vehicle 400 moves the dry applicator 575 along the surface 450, the suspension assemblies 440 are operable to further raise the frame 405 to an operating position, which may be greater than any previously described position. In the illustrated embodiment, the operating position may range from 38.5 inches to 104 inches between the portion or point 720 and the surface 450. In addition, because the sprayer boom 430 is not used with the dry applicator 575, the sprayer boom 430 is removed from the vehicle 400 during operation of the dry applicator 575. In other embodiments, the sprayer boom 430 remains coupled to the vehicle 400 with the sprayer boom 430 folded (e.g., rotated) substantially parallel to the vehicle longitudinal axis 410 to reduce a lateral footprint of the vehicle 400.

Figure 38:
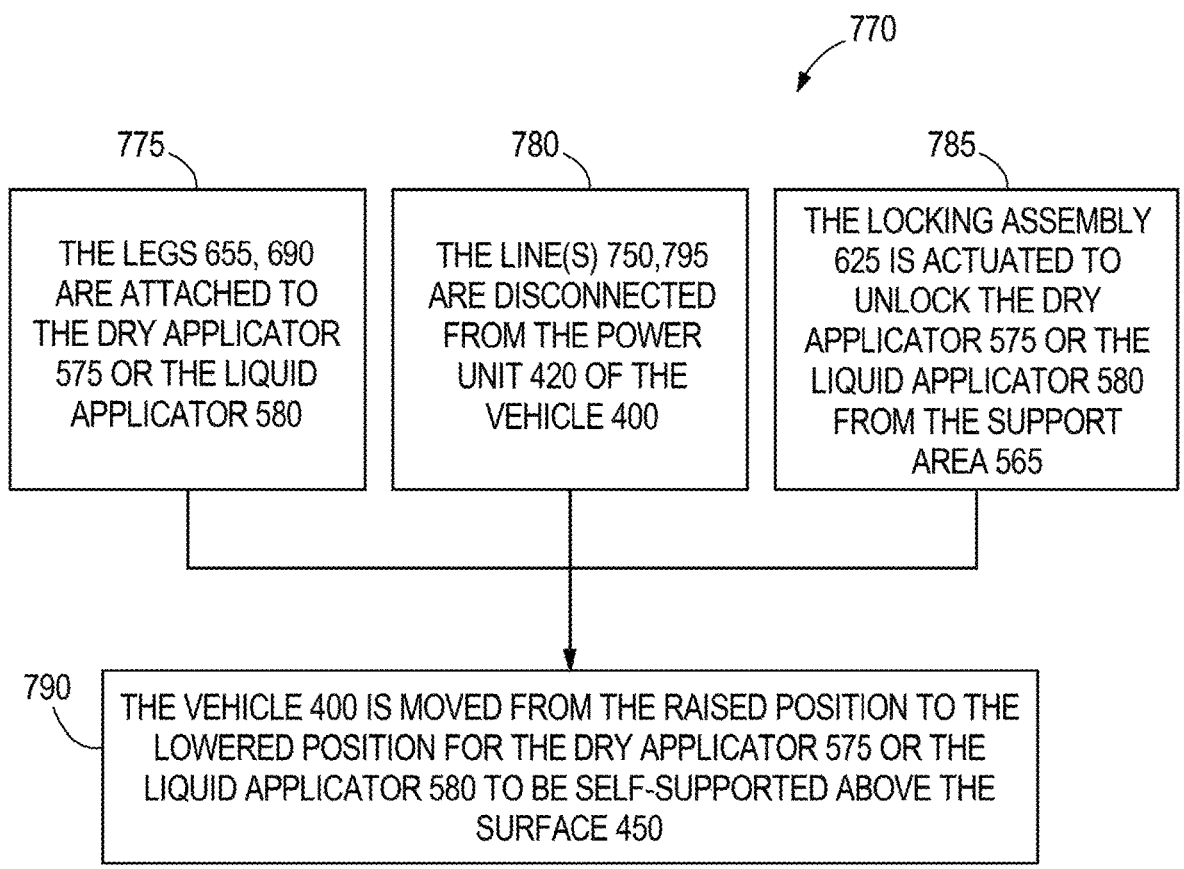
FIG. 38 illustrates a method of decoupling the dry applicator from the agricultural vehicle of FIG. 28.

With reference to FIGS. 34, 35 and 38, an operator of the vehicle 400 can selectively decouple the dry applicator 575 from the vehicle 400 as illustrated by a decoupling method 770. For example, to decouple the dry applicator 575 from the vehicle 400, after the vehicle moves to the coupling position, the legs 655 are attached to the dry applicator 575 (step 775), the hydraulic/electrical line(s) 750 are disconnected from the power unit 420 (step 780), and the locking assembly 625 is actuated into the unlocked position (step 785). Thereafter, the vehicle 400 moves from the coupling position (FIG. 35) to the lowered position (FIG. 34) for the dry applicator 575 to be self-supported or freestanding above the surface 450 as illustrated in step 790. In another embodiment, the vehicle 400 may be moved into the lowered position before any of steps 775, 780 or step 785. In general, the dry applicator 575 remains stationary relative to the surface 450 as the vehicle 400 is raised/lowered to couple/decouple the dry applicator 575 to the vehicle 400. After the vehicle 400 is decoupled from the dry applicator 575, the vehicle 400 can then move relative to the dry applicator 575.

Figure 39:
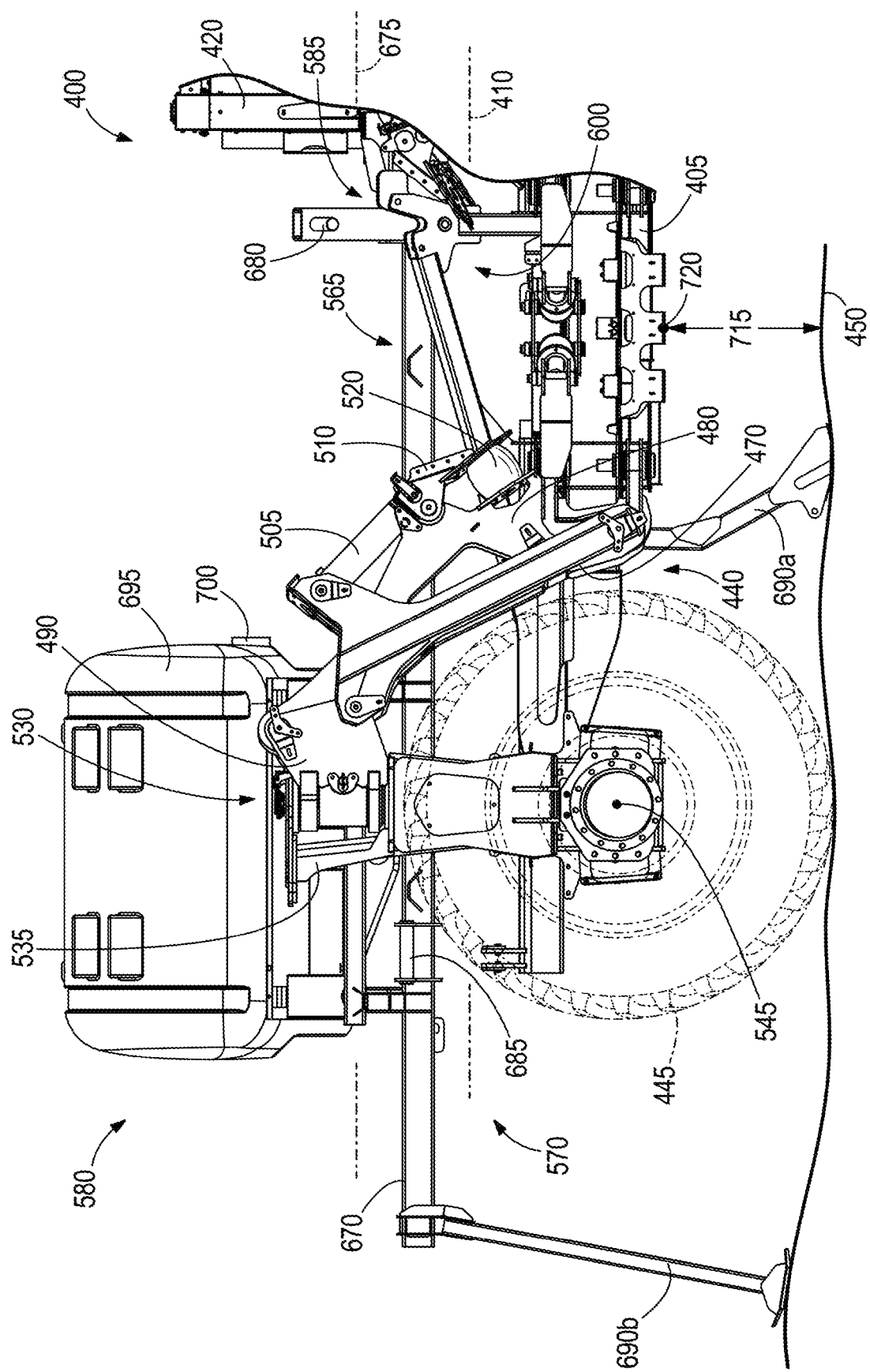
FIG. 39 is a side view of a portion of the agricultural vehicle of FIG. 28 and the liquid applicator of FIG. 33 with the agricultural vehicle in a lowered position decoupled from the liquid applicator.
Figure 40:
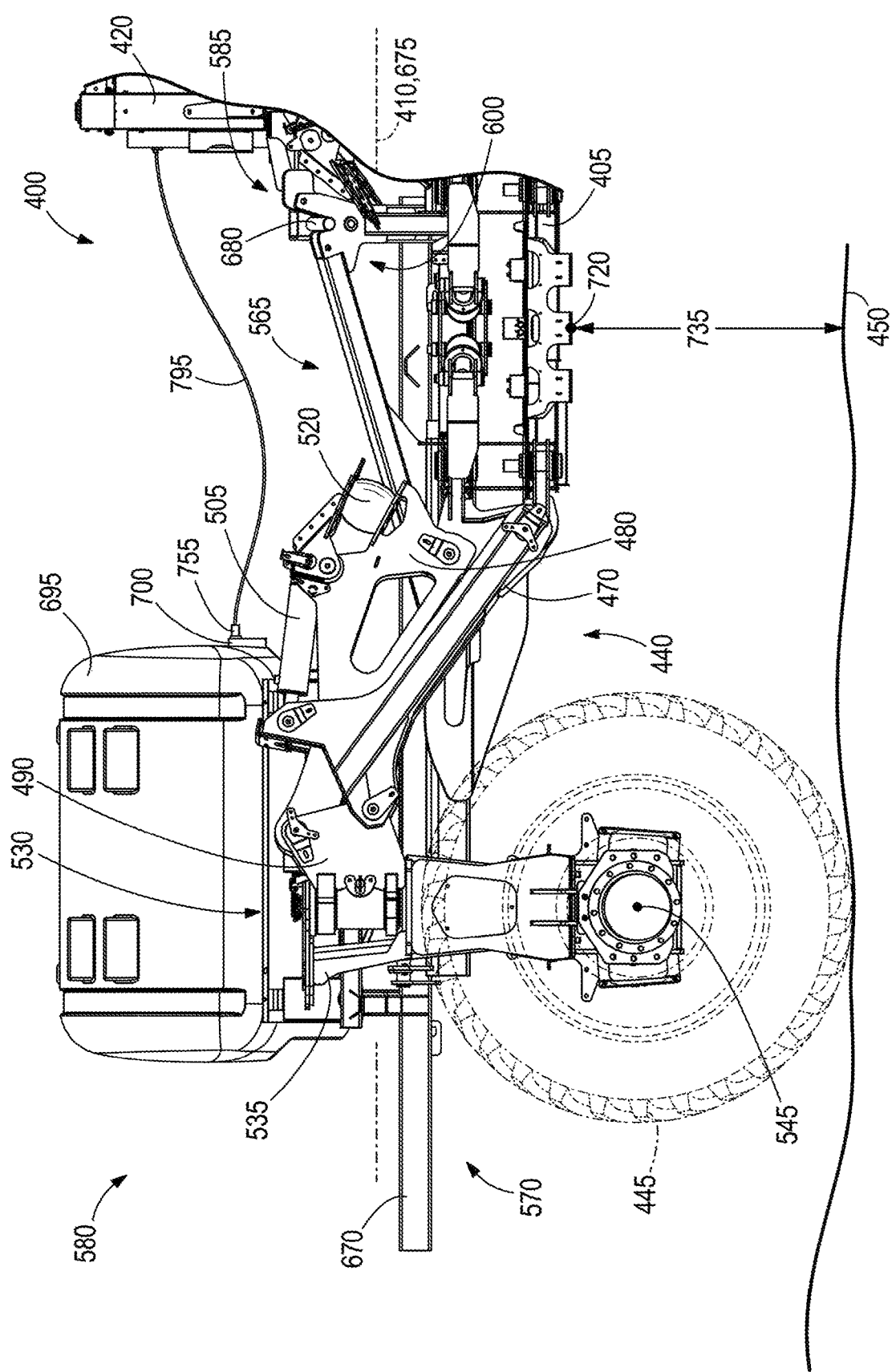
FIG. 40 is a side view of a portion of the agricultural vehicle of FIG. 28 and the liquid applicator of FIG. 33 with the agricultural vehicle in a coupling position coupled to the liquid applicator.

With reference to FIGS. 37, 39, and 40, the vehicle 400 is selectively coupled to the liquid applicator 580 in the same manner as the coupling method 705 of coupling the dry applicator 575 to the vehicle 400 to distribute the liquid material contained within the liquid applicator 580 onto the surface 450. For example, the vehicle 400 is moved into the lowered position (step 710; FIG. 39), the support area 565 is aligned with the liquid applicator 580 (step 725), and the vehicle 400 is moved into the coupling or attachment position for the connection areas 600, 605 to engage the connection pins 680, 685 of the liquid applicator 580 (step 730; FIG. 40). In the coupling position, the liquid applicator 580 is transitioning to be fully supported by the vehicle 400 such that the legs 690 can be detached from the liquid applicator 580 (step 740; FIG. 40). The illustrated locking assembly 625 is actuated to lock the liquid applicator 580 to the vehicle 400 as illustrated in step 745. In other embodiments, the locking assembly 625 is actuated prior to raising the frame 405 from the coupling position. Fluid line(s) 795, which are coupled to the output unit 700 of the liquid applicator 580, are coupled to the power unit 420 (step 760) to be in fluid communication with the sprayer boom 430, which is now coupled to the front portion 435 of the vehicle 400. In one embodiment, quick-disconnects 755 are coupled between the fluid lines 795 and the power unit 420 and/or coupled between the fluid lines 795 and the output unit 700.

After the fluid lines 795 are in communication with the sprayer boom 430, the operator of the vehicle 400 can control distribution of the liquid material within the liquid containers 695 onto the surface 450 via the sprayer boom 430 as the vehicle 400 moves along the surface 450 as illustrated in step 765. In addition, as the vehicle 400 moves the liquid applicator 580 along the surface 450, the suspension assemblies 440 are operable to further raise the frame 405 to an operating position that ranges from 38.5 inches to 104 inches between the point 720 and the surface 450.

With reference to FIGS. 38-40, an operator of the vehicle 400 can selectively decouple the liquid applicator 580 from the vehicle 400 in the same manner as the decoupling method 770 of decoupling the dry applicator 575 from the vehicle 400. To decouple the liquid applicator 580 from the vehicle 400, after the vehicle moves to the coupling position the legs 690 are attached to the liquid applicator 580 (step 775), the fluid lines 795 are disconnected from the power unit 420 (step 780), and the locking assembly 625 is actuated into the unlocked position (step 785). Thereafter, the vehicle 400 moves from the coupling position (FIG. 40) to the lowered position (FIG. 39) for the liquid applicator 580 to be self-supported or freestanding above the surface 450 by the legs 690 as illustrated in step 790. In another embodiment, the vehicle 400 may be moved into the lowered position before any of steps 775, 780 or step 785. In general, the liquid applicator 580 remains stationary relative to the surface 450 as the vehicle 400 is raised/lowered to couple/decouple the liquid applicator 580 to the vehicle 400. After the vehicle 400 is decoupled from the liquid applicator 580, the vehicle 400 can then move relative to the liquid applicator 580.

The vehicle 400, which includes the ride height adjusting suspension assemblies 440, can quickly and efficiently change out or 'swap' a dry applicator 575 with another dry applicator 575, a dry applicator with a liquid applicator 580, a liquid applicator 580 with another liquid applicator 580, or a liquid applicator 580 with a dry applicator 575, and in each instance do so without the use of another machine (e.g., a crane/lift). For example, a crane/lift is conventionally used to remove a first applicator (e.g., the dry applicator 575) from a vehicle not having the suspension assemblies 440, and to place a second applicator (e.g., the liquid applicator 580) onto that vehicle. Such a process using the crane/lift can take more than an hour. Replacing a first applicator (e.g., the dry applicator 575) with a second applicator (e.g., the liquid applicator 580) utilizing the vehicle 400 as described and illustrated, however, can be accomplished in less than 30 minutes. For example, the decoupling method 770 of the dry applicator 575 followed by the coupling method 705 of the liquid applicator 580 can be accomplished in less than 30 minutes. Likewise, the decoupling method 770 of the liquid applicator 580 followed by the coupling method 705 of the dry applicator 575 can be accomplished in less than 30 minutes. The decoupling method 770 of the dry applicator 575 (or liquid applicator 580) followed by the coupling method 705 of another dry applicator 575 (or another liquid applicator 580) can be accomplished in less than 30 minutes. Further, a first dry applicator 575 or first liquid applicator 580 need not be identically sized with a second dry applicator 575 or second liquid applicator 580 in terms of material containment or capacity. Additionally, coupling a dry applicator 575 to the vehicle 400 from a freestanding position can be accomplished in less than 15 minutes, while coupling a wet applicator 580 to the vehicle 400 from a freestanding position can be accomplished in less than 15 minutes. Differently sized wet and dry applicators are operable to be coupled and decoupled with the vehicle 400 as hereinbefore described.

Although the disclosure has been described in detail with reference to certain preferred embodiments, variation and modifications exist within the scope and spirit of one or more independent aspects as described. Various features and advantages of the disclosure are set forth in the following claims.

The invention claimed is:

1. An agricultural vehicle comprising:
a frame;
a plurality of suspension assemblies coupled to the frame, all suspension assemblies of the plurality of suspension assemblies configured to pivot together relative to the frame to increase or decrease a vertical distance between the frame and a surface supporting the agricultural vehicle;
a plurality of wheels, wherein one wheel of the plurality of wheels is coupled to one suspension assembly of the plurality of suspension assemblies, wherein each suspension assembly of the plurality of suspension assemblies is also configured to pivot relative to the frame to change a track width of at least two wheels of the plurality of wheels, and wherein the at least two wheels of the plurality of wheels are each movable about a respective steering axis; and
at least two actuators, wherein each actuator of the at least two actuators is coupled to a respective suspension assembly of the plurality of suspension assemblies and is configured to move one wheel of the at least two wheels.

2. The agricultural vehicle of claim 1, wherein each actuator includes an outer member and an inner member, and wherein the inner member is rotatable relative to the outer member.

3. The agricultural vehicle of claim 2, wherein the inner and outer members are concentric with the respective steering axis.

4. The agricultural vehicle of claim 1, wherein the plurality of suspension assemblies is configured to move the frame between a first position defined by a first vertical distance between a point on the frame and the surface and a second position defined by a second vertical distance between the point on the frame and the surface, and wherein a difference between the second vertical distance and the first vertical distance is at least 1 meter.

5. The agricultural vehicle of claim 1, wherein the plurality of suspension assemblies includes four four-bar linkage systems, the plurality of wheels includes four wheels, and the at least two actuators includes four rotary actuators.

6. The agricultural vehicle of claim 1, wherein the frame defines a support area configured to support a wet applicator above the surface and configured to support a dry applicator above the surface.

7. The agricultural vehicle of claim 6, wherein the vehicle is configured to transition one of the wet applicator or the dry applicator from a freestanding position to a position in which the one of the wet applicator or the dry applicator is fully supported by the support area of the frame.

8. The agricultural vehicle of claim 7, wherein the vehicle is configured to transition the other one of the wet applicator or the dry applicator from a freestanding position to a position in which the other one of the wet applicator or the dry applicator is fully supported by the support area of the frame.

9. The agricultural vehicle of claim 6, wherein the wet applicator is configured to contain greater than 1800 gallons of liquid material.

10. The agricultural vehicle of claim 6, wherein the dry applicator is configured to contain greater than 300 cubic feet of solid material.

11. The agricultural vehicle of claim 6, wherein the agricultural vehicle is configured such that one of the dry applicator or the wet applicator can be unsecured from the support surface, removed from the support surface, replaced with the other one of the dry applicator or the wet applicator, and the other one of the dry applicator or the wet applicator secured to the support surface all of which is accomplished in less than 30 minutes.

12. The agricultural vehicle of claim 1, wherein the plurality of suspension assemblies is configured to move the frame between a first position defined by a first vertical distance between a point on the frame and the surface and a second position defined by a second vertical distance between the point on the frame and the surface, and wherein the second vertical distance is greater than the first vertical distance and greater than 50 inches.

13. An agricultural vehicle comprising:
a frame;
a plurality of suspension assemblies coupled to the frame, all suspension assemblies of the plurality of suspension assemblies configured to together increase or decrease a vertical distance between the frame and a surface supporting the agricultural vehicle;
a plurality of wheels, wherein one wheel of the plurality of wheels is coupled to one suspension assembly of the plurality of suspension assemblies, and wherein at least two wheels of the plurality of wheels are each movable about a respective steering axis; and
at least two actuators, wherein each actuator of the at least two actuators is coupled to a respective suspension assembly of the plurality of suspension assemblies and is configured to move one wheel of the at least two wheels;
wherein the frame defines a support area configured to support a wet applicator above the surface and configured to support a dry applicator above the surface; and
wherein the vehicle is configured to transition one of the wet applicator or the dry applicator from a freestanding position to a position in which the one of the wet applicator or the dry applicator is fully supported by the support area of the frame.

14. The agricultural vehicle of claim 13, wherein the vehicle is configured to transition the other one of the wet applicator or the dry applicator from a freestanding position to a position in which the other one of the wet applicator or the dry applicator is fully supported by the support area of the frame.

15. The agricultural vehicle of claim 13, wherein the wet applicator is configured to contain greater than 1800 gallons of liquid material.

16. The agricultural vehicle of claim 13, wherein the dry applicator is configured to contain greater than 300 cubic feet of solid material.

17. The agricultural vehicle of claim 13, wherein the agricultural vehicle is configured such that one of the dry applicator or the wet applicator can be unsecured from the support surface, removed from the support surface, replaced with the other one of the dry applicator or the wet applicator, and the other one of the dry applicator or the wet applicator secured to the support surface all of which is accomplished in less than 30 minutes.

* * * * *